US010720986B2

(12) United States Patent
Mengwasser et al.

(10) Patent No.: US 10,720,986 B2
(45) Date of Patent: *Jul. 21, 2020

(54) APPARATUSES, SYSTEMS AND METHODS FOR OBTAINING INFORMATION ABOUT ELECTROMAGNETIC ENERGY EMITTED FROM THE EARTH, SUCH AS FOR LOCATING AN INTERFERENCE SOURCE ON EARTH

(71) Applicant: SES S.A., Betzdorf (LU)

(72) Inventors: Brian Mengwasser, Washington, DC (US); Detlef Schulz, Trier (DE)

(73) Assignee: SES S.A., Betzdorf (LU)

( * ) Notice: Subject to any disclaimer, the term of this patent is extended or adjusted under 35 U.S.C. 154(b) by 187 days.

This patent is subject to a terminal disclaimer.

(21) Appl. No.: 15/984,806

(22) Filed: May 21, 2018

(65) Prior Publication Data

US 2018/0278322 A1    Sep. 27, 2018

Related U.S. Application Data

(63) Continuation-in-part of application No. 14/648,931, filed as application No. PCT/EP2013/074372 on Nov.
(Continued)

(51) Int. Cl.
*H04B 7/185* (2006.01)
*B64G 1/10* (2006.01)
(Continued)

(52) U.S. Cl.
CPC ....... *H04B 7/18515* (2013.01); *B64G 1/1007* (2013.01); *G01S 5/02* (2013.01);
(Continued)

(58) Field of Classification Search
CPC .. B64G 1/1007; B64G 1/242; H04B 7/18515; H04B 7/18578; H04B 7/18513; G01S 5/04; G01S 5/06; G01S 5/02; G01S 5/0215

See application file for complete search history.

(56) References Cited

U.S. PATENT DOCUMENTS 4,276,553 A    6/1981 Fletcher
4,387,391 A    6/1983 Hecker
(Continued)

FOREIGN PATENT DOCUMENTS

CN    102544752 A    7/2012
DE    10 2014 019 271 A1    6/2016
(Continued)

OTHER PUBLICATIONS

International Search Report and Written Opinion dated Jan. 31, 2014 in connection with International Application No. PCT/EP2013/074372.
(Continued)

*Primary Examiner* — Nhan T Le
(74) *Attorney, Agent, or Firm* — Wolf, Greenfield & Sacks, P.C.

(57) ABSTRACT

An observation satellite is used for obtaining information about electromagnetic energy emitted from the earth. The observation satellite orbits the earth in an orbit having an inclination larger than 90° and smaller than 270°. Further, the observation satellite comprises at least one receiving antenna, the at least one receiving antenna having a receiving pattern directed towards the earth, and suitable for receiving electromagnetic energy in the radio frequency range as the observation satellite is orbiting relative to the surface of the earth. The observation satellite also comprises a transmitter configured for at least one of: (i) retransmitting, to a relay spacecraft, the received electromagnetic energy,
(Continued)

(ii) transmitting, to the relay spacecraft, information representing the received electromagnetic energy, and (iii) transmitting, to the relay spacecraft, information derived from the received electromagnetic energy. The invention also relates to systems and methods therefor.

32 Claims, 11 Drawing Sheets

Related U.S. Application Data 21, 2013, now Pat. No. 9,985,719, which is a continuation-in-part of application No. 13/705,566, filed on Dec. 5, 2012, now Pat. No. 9,086,471.

(51) Int. Cl.
G01S 5/04 (2006.01)
G01S 5/06 (2006.01)
G01S 5/02 (2010.01)

(52) U.S. Cl.
CPC .............. *G01S 5/0215* (2013.01); *G01S 5/04* (2013.01); *G01S 5/06* (2013.01); *H04B 7/18578* (2013.01)

(56) References Cited

U.S. PATENT DOCUMENTS

| | | | |
|---|---|---|---|
| 5,008,679 A | 4/1991 | Effland et al. | |
| 5,570,096 A | 10/1996 | Knight et al. | |
| 5,570,099 A | 10/1996 | DesJardins | |
| 5,590,395 A * | 12/1996 | Diekelman | H04B 7/18539 |
| | | | 455/13.1 |
| 5,844,521 A | 12/1998 | Stephens et al. | |
| 6,005,514 A | 12/1999 | Lightsey | |
| 6,018,312 A | 1/2000 | Haworth | |
| 6,020,847 A | 2/2000 | Upton et al. | |
| 6,147,640 A | 11/2000 | Wachs | |
| 6,226,493 B1 | 5/2001 | Leopold et al. | |
| 6,255,992 B1 | 7/2001 | Madden | |
| 6,407,703 B1 | 6/2002 | Minter et al. | |
| 6,417,799 B1 | 7/2002 | Aubain et al. | |
| 6,445,685 B1 | 9/2002 | Carrozza et al. | |
| 6,522,865 B1 * | 2/2003 | Otten | H04B 7/1858 |
| | | | 455/13.1 |
| 6,583,755 B2 | 6/2003 | Martinerie et al. | |
| 6,618,009 B2 | 9/2003 | Griffin et al. | |
| 6,677,893 B2 | 1/2004 | Rideout et al. | |
| 6,734,824 B2 | 5/2004 | Herman | |
| 6,933,884 B2 * | 8/2005 | Martin | B63B 49/00 |
| | | | 342/357.55 |
| 7,370,566 B2 | 5/2008 | Furman | |
| 7,460,830 B2 | 12/2008 | Moore, III | |
| 7,616,155 B2 | 11/2009 | Bull et al. | |
| 7,893,875 B1 | 2/2011 | Smith | |
| 8,004,459 B2 | 8/2011 | Ho et al. | |
| 8,077,088 B2 | 12/2011 | Rose | |
| 8,755,425 B2 * | 6/2014 | Morris | H04B 1/707 |
| | | | 370/325 |
| 8,797,223 B2 | 8/2014 | Raguenet et al. | |
| 9,086,471 B2 * | 7/2015 | Mengwasser | H04B 7/18515 |
| 9,755,729 B2 | 9/2017 | Seel | |
| 9,985,719 B2 * | 5/2018 | Mengwasser | H04B 7/18515 |
| 2001/0045494 A1 | 11/2001 | Higgins | |
| 2004/0027276 A1 | 2/2004 | Herman | |
| 2005/0085186 A1 | 4/2005 | Sandrin | |
| 2005/0215267 A1 | 9/2005 | Cartmell | |
| 2008/0081556 A1 | 4/2008 | Robinson | |
| 2008/0258986 A1 | 10/2008 | Milbrandt et al. | |
| 2009/0079634 A1 | 3/2009 | Rose | |
| 2009/0279733 A1 | 11/2009 | Schuster et al. | |
| 2010/0124895 A1 | 5/2010 | Martin et al. | |
| 2010/0289342 A1 | 11/2010 | Maness | |
| 2011/0057839 A1 | 3/2011 | Seifer et al. | |
| 2011/0226907 A1 | 9/2011 | Robinson | |
| 2012/0075150 A1 | 3/2012 | Raguenet et al. | |
| 2013/0009812 A1 | 1/2013 | Sato et al. | |
| 2014/0154972 A1 | 6/2014 | Mengwasser | |
| 2015/0311972 A1 | 10/2015 | Mengwasser | |

FOREIGN PATENT DOCUMENTS

| | | |
|---|---|---|
| EP | 0 858 176 A1 | 8/1998 |
| EP | 2 365 646 A1 | 9/2011 |
| JP | 9-127229 A | 5/1997 |
| JP | 2001-148651 A | 5/2001 |
| JP | 2003-507747 A | 2/2003 |
| JP | 2004-328088 A | 11/2004 |
| JP | 2006-349470 A | 12/2006 |
| JP | 2007-517466 A | 6/2007 |
| RU | 2481252 C1 | 5/2013 |
| WO | WO 01/17133 A1 | 3/2001 |
| WO | WO 02/077662 A1 | 10/2002 |

OTHER PUBLICATIONS

Written Opinion of the International Preliminary Examining Authority dated Nov. 10, 2014 from corresponding International Application No. PCT/EP2013/074372.
International Preliminary Report on Patentability dated Mar. 5, 2015 in connection with International Application No. PCT/EP2013/074372.
Chinese Office Action dated May 4, 2016 from Chinese Patent Application No. 201380063879.8.
Japanese Office Action dated Sep. 25, 2017 and English translation thereof in connection with Japanese Application No. 2015-545731.
Japanese Notice of Reasons for Rejection dated May 28, 2018 and English translation thereof in connection with Japanese Application No. 2015-545731.
Russian Office Action dated Oct. 11, 2017 and English translation thereof in connection with Russian Application No. 2015126869/07(041815).
[No Author Listed], An Introduction to MUSIC and ESPRIT. GIRD Systems, Inc., pdf created Jun. 27, 2012, available from http://www.girdsystems.com/pdf/GIRD_Systems_Intro_to_MUSIC_ESPRIT.pdf.
[No Author Listed ], Direction of Arrival Estimation. University of Toronto, pdf created Feb. 7, 2007, available from http://www.comm.utoronto.ca/~rsadve/Notes/DOA.pdf. pp. 1-25.
Aravind et al., Mission to Retrograde Geo-equatorial Orbit (RGEO) Using Lunar Swing-by. 2012 IEEE Aerospace Conference. Mar. 3-10, 2012; pp. 1-8.
Cheney, The Linear Sampling Method and the MUSIC Algorithm. CODEN:LUTEDX/(TEAT-7089)/1-6/(2000), Feb. 6, 2001, Electromagnetic Theory, Department of Electrical and Information Technology, Lund University, Sweden, downloaded on Jul. 3, 2013, available from http://lup.lub.lu.se/luur/download?func=downloadFile&recordOId=1774659&fileOId=1774663.
Gething, Radio Direction Finding and Superresolution. Peter Peregrinus Ltd., London, UK, Second Edition, 1991.
Jiang, Applied Satellite Meteorology, Feb. 1, 2006, p. 2, lines 22-27.
Lang, Conjunction/Interference Between LEO and GEO Comsats. Proceedings of the AAS/AIAA Astrodynamics Specialist Conference held in Sun Valley, Idaho, Aug. 4-7, 1997, AAS Paper 97-668, 15 pages.
Lipsky, Microwave passive direction finding. SciTech Publishing. 2003.
Oltrogge et al., Effective Strategies for Satellite Communications RFI Mitigation. 2012 IEEE First AESS European Conference on Satellite Telecommunications (ESTEL). Oct. 2-5, 2012, pp. 1-7.
Schmidt, Multiple Emitter Location and Signal Parameter Estimation. IEEE Transactions on Antennas and Propagation. Mar. 1986;34(3):276-280.
Swindlehurst et al., A Performance Analysis of Subspace-Based Methods in the Presence of Model Errors, Part I: The MUSIC

(56) References Cited

OTHER PUBLICATIONS

Algorithm. 1992, pp. 1758-1774, available from http://citeseerx.ist.psu.edu/viewdoc/download?doi=10.1.1.53.3945&rep=rep1&type=pdf.
Tuncer et al, Classical and Modern Direction-of-Arrival Estimation. Academic Press by Elsevier, Burlington, MA, 2009.

* cited by examiner

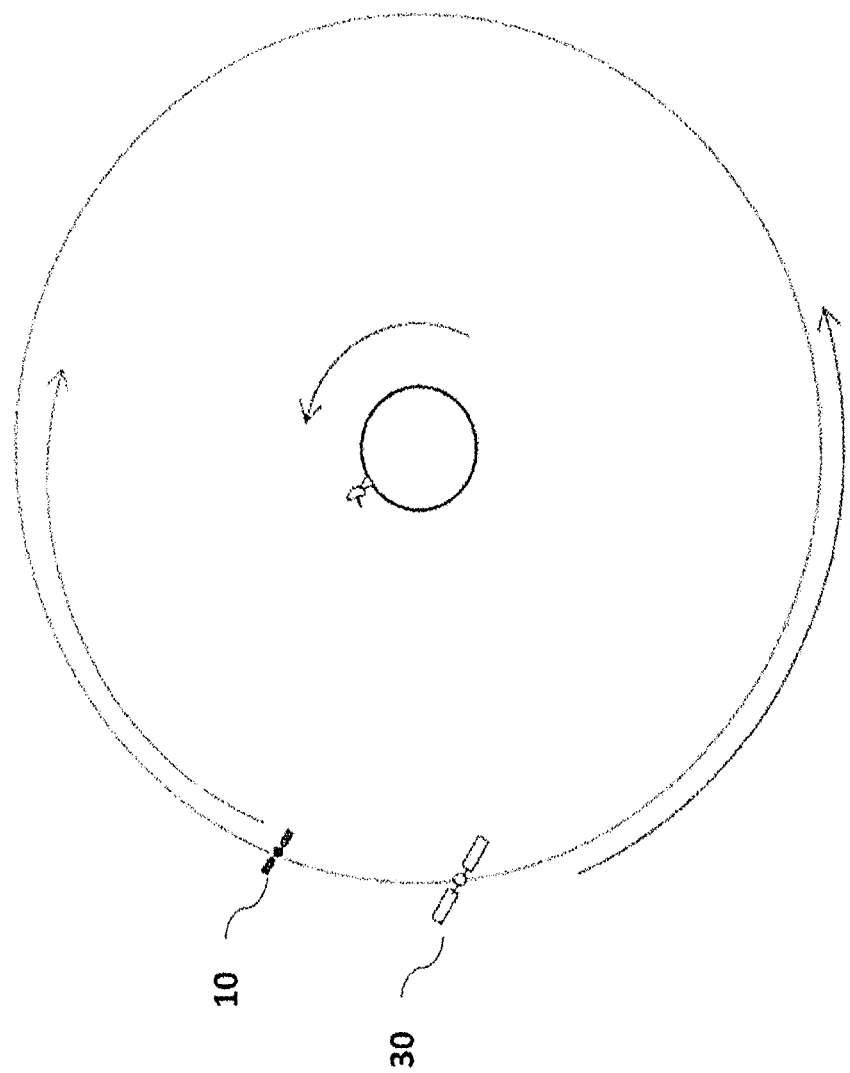

APPARATUSES, SYSTEMS AND METHODS FOR OBTAINING INFORMATION ABOUT ELECTROMAGNETIC ENERGY EMITTED FROM THE EARTH, SUCH AS FOR LOCATING AN INTERFERENCE SOURCE ON EARTH

CROSS REFERENCE TO RELATED APPLICATIONS

This application is a continuation-in-part of U.S. patent application Ser. No. 14/648,931, filed Jun. 2, 2015, which is a a national stage of PCT/EP2013/074372, filed Nov. 21, 2013, which is a continuation-in-part of U.S. patent application Ser. No. 13/705,566, filed Dec. 5, 2012, which are hereby incorporated by reference in their entirety.

FIELD OF TECHNOLOGY

The present invention notably relates to telecommunications and to obtaining information about electromagnetic energy emitted from a source, or from sources, on the earth. The invention may for example be used for locating an interference source on earth, although the invention is not limited to this particular application.

BACKGROUND

Satellite communications notably involve the transmission of signals from a station on earth towards a satellite and vice versa. Satellite communications may be intended for providing communication services between two points on earth. This includes point-to-point services (e.g. internet, satellite phones) and point-to-multipoint (broadcast) services (e.g. TV). The stations engaged in satellite communications may be fixed (e.g. rooftop dish) or mobile (e.g. vehicles, ships, planes, hand-held devices). With the increase use of satellite and terrestrial communications, the risk of interferences between different communications also increases.

In the past, there have been numerous efforts to locate interfering transmission stations and, more generally, there have been numerous efforts to resolve interference issues and to alleviate the disruptions caused thereby (including reduction of the usable capacity of a satellite communication system).

A known approach to locate an interfering transmission station on earth is to use ground stations. For example, U.S. Pat. No. 5,008,679 relates to a method of locating an unknown radio-frequency transmitter using correlations between signals received by different satellites. However, performing ground-based geolocation is difficult because it relies on signal correlation between multiple satellites and multiple ground stations: a time intensive process with many opportunities for error propagation within the calculation. Furthermore, the ability to perform ground-based geolocation is dependent on many factors, including the existence of and extensive knowledge of adjacent satellites, the existence of and extensive knowledge of known reference signals, and the existence of necessary ground hardware, and as a result, ground-based geolocation is ineffective in many cases.

Another known approach uses helicopters or unmanned aerial vehicles (UAVs) for geolocation. However, this approach is resource inefficient and only offers one-off analyses.

In view of the above, there is a need to reduce the amount of interference in the context of satellite communications or, when this is not possible, to adopt techniques to cope with such interferences.

SUMMARY

To meet or at least partially meet the above-mentioned need, apparatuses, systems and methods according to the invention are defined in the independent claims. Particular embodiments are defined in the dependent claims, and are explained in the present description.

In one embodiment, a satellite, hereinafter referred to as "observation satellite", is used for obtaining information about electromagnetic energy emitted from a source, or from sources, on the earth. The observation satellite orbits the earth in an orbit having an inclination larger than 90° (i.e., 90 degrees) and smaller than 270° (i.e., 270 degrees), such an orbit being defined as retrograde to the direction of the Earth's natural rotation. Further, the observation satellite comprises at least one receiving antenna and a transmitter. The at least one receiving antenna has a receiving pattern directed towards the earth, and is suitable for receiving electromagnetic energy in the radio frequency range as the observation satellite is orbiting relative to the surface of the earth. The transmitter is configured for at least one of: (i) retransmitting at least part of the received electromagnetic energy, (ii) transmitting information representing at least part of the received electromagnetic energy, and (iii) transmitting information derived from at least part of the received electromagnetic energy.

Thus, the observation satellite is able to gather data which significantly improves the capability to understand the composition and origin of energy transmitted into space for the purposes of satellite communications. Given that the majority of communications satellites are designed for communications rather than data-gathering or analysis functions, an observation satellite can provide radically more data, which cannot be gathered by communication satellites as they exist today, about the nature of uplink transmissions. Interference detection, system optimization, spectrum planning and many other applications benefit greatly from the data and understanding produced by the observation satellite. In particular, by placing the observation satellite in a highly inclined (retrograde) orbit, its velocity relative to the surface of the earth is higher than that of a satellite in a prograde orbit at a similar altitude and the observation satellite is able to frequently revisit a given position relative to the Earth's surface and receive transmissions from a certain area on the Earth. Furthermore, placing, in one embodiment, the observation satellite at an altitude similar to the altitude of satellites which transmissions of interest are generally intended for (hereinafter referred to as "target satellites") is advantageous in that the observation satellite is then able to observe a large area on Earth and observe most signals intended for certain target satellites.

The use of the above-mentioned observation satellite for understanding and handling interference issues in the context of satellite communications results from a change of focus. The aim is to attempt to find out which signals are emitted into space from sources on earth. However, rather than attempting to do so from a point near the earth surface, the observation satellite enables to do so from a point into space and especially from a point near the orbit of interest. This thus enables information to be gathered about the signals reaching the orbit of interest more effectively.

The inclination is the angle between the equatorial plane and the plane in which the satellite orbits the earth. A satellite with an inclination of 0° (i.e., 0 degree) is defined as orbiting in the equatorial plane in direction of the rotation direction of the earth.

As mentioned above, the observation satellite's transmitter is configured for performing one of three operations (denoted (i), (ii) and (iii) respectively), a combination of two of these three operations (namely, (i)+(ii), (i)+(iii), or (ii)+(iii)), or all three operations (namely, (i)+(ii)+(iii)).

Namely, in a sub-embodiment, the transmitter is configured to retransmit at least part of the received electromagnetic energy (for example to a ground station on earth, or to another satellite). Hence, the received electromagnetic energy, or a part thereof, may be transmitted without any processing by the observation satellite itself. In that case, any processing of the received electromagnetic energy, or a part thereof, (for analysis, geolocation, etc.) may then be performed outside the observation satellite, for example on earth, by a processing station.

Alternatively, or additionally, in another sub-embodiment, the transmitter may be configured to transmit (for example to a ground station on earth, or to another satellite) information representing at least part of the received electromagnetic energy. This may, for example, mean digitizing and/or compressing the received electromagnetic energy, or a part thereof.

Alternatively, or additionally, in yet another sub-embodiment, the transmitter may be configured to transmit (for example to a ground station on earth, or to another satellite) information derived from at least part of the received electromagnetic energy (especially instead of the received electromagnetic energy itself). The information may be derived from the received electromagnetic energy, or from a part thereof, for example by determining or estimating, using some equipment (also called "payload") within the satellite itself, the location on earth of the source of received electromagnetic energy (such as the source of an interfering source). Deriving information from the received electromagnetic energy, or from a part thereof, may also comprise generating, using some equipment within the satellite itself, information on the energy spectrum, polarization, modulation scheme, etc. of the received electromagnetic energy.

In other words, the observation satellite is used for obtaining information about electromagnetic energy emitted from a source, or from sources, on the earth in the sense that the process of actually obtaining the information about the received electromagnetic energy may be performed within or outside the observation satellite. Namely, the observation satellite may act as a tool contributing to the process of obtaining information about electromagnetic energy emitted from a source, or from sources, on the earth.

In one embodiment, the observation satellite is suitable for obtaining information about electromagnetic energy emitted from a source, or from sources, on the earth and reaching the geostationary orbit. Monitoring signals transmitted towards satellites in the geostationary orbital arc at an altitude of roughly 35800 kilometers is particularly interesting since the geostationary orbit is of paramount importance for numerous satellite communications.

In one embodiment, the observation satellite's transmitter is configured to transmit, towards the earth, at least part of the received electromagnetic energy or the information representing, or derived from, at least part of the received electromagnetic energy. Doing so enables a receiving station on earth, or a processing station communicating with such receiving station, to derive further information from the electromagnetic energy received by the satellite. For example, the location of the source of some received electromagnetic energy may be determined.

The transmitter may however not be configured to directly send the received electromagnetic energy (or a part thereof) or the information representing, or derived from, the received electromagnetic energy towards the earth. Instead, another satellite or spacecraft may function as a relay station relaying the transmission to earth. Such relay satellite or spacecraft may be configured to perform further processing of information received from the observation satellite. The observation satellite may transmit, to the relay satellite or spacecraft, using one or more optical communication link.

In one embodiment, the information derived from the received electromagnetic energy is obtained by processing at least part of the received electromagnetic energy within the observation satellite. In such case, processing equipment is integrated with the observation satellite to do so.

In one embodiment, the processing comprises at least one of: (a) selectable down-conversion of analog signal to common intermediate frequency; (b) analog-to-digital conversion of signals provided by, i.e. carried by, at least part of the received electromagnetic energy; (c) spectrum analysis of at least part of the received electromagnetic energy; (d) Doppler shift analysis of at least part of the received electromagnetic energy; (e) Doppler rate analysis of at least part of the received electromagnetic energy; (f) direction of arrival or angle of arrival processing; (g) time difference of arrival (TDOA) processing; (h) frequency difference of arrival (FDOA) processing; (i) reference measurements between two or more antenna elements; (j) data filtering; and (k) data compression.

Thus, the observation satellite may be capable of performing different kinds of processing on the received electromagnetic energy.

For example, through the analog-to-digital conversion, the signals carried by the received electromagnetic energy become accessible for further digital processing.

Spectrum analysis and direction of arrival processing (or direction finding (DF)) may also help to identify the composition and the origin of the electromagnetic energy respectively. A skilled person would know how to perform spectrum analysis and direction-of-arrival (DOA) processing. In that respect, more background about DOA processing may for example be found in Schmidt, R. O., "*Multiple emitter location and signal parameter estimation*," IEEE Transactions on Antennas and Propagation, Vol. 34, No. 3, 276-280, March, 1986; or in Lipsky, Stephen E., "*Microwave passive direction finding*", SciTech Publishing, 2003. Numerous other references exist in the academic literature regarding direction-of-arrival processing.

Data filtering and data compression could reduce the data amount transmitted by the observation satellite.

In one embodiment, the at least one receiving antenna of the observation satellite is suitable to receive electromagnetic energy in a radio frequency range between 1 GHz and 100 GHz. Obtaining, and then analyzing, electromagnetic energy in the microwave range (i.e., between 1 GHz and 100 GHz) is particularly advantageous since satellite communications are generally performed in this range so that interference in the context of satellite communications is mainly caused by electromagnetic energy in this frequency range.

In one sub-embodiment of the previously mentioned embodiment, the at least one receiving antenna of the observation satellite is suitable to receive electromagnetic energy in a radio frequency range being at least one of: (a) between 1 and 2 GHz (L-band); (b) between 2 and 4 GHz (S-band); (c) between 4 and 8 GHz (C-band); (d) between 8 and 12 GHz (X-band); (e) between 12 and 18 GHz ($K_u$-band); and (f) between 26.5 and 40 GHz ($K_a$-band). These exemplary frequency bands are of particular interest for satellite communications.

In one embodiment, the at least one receiving antenna of the observation satellite is suitable to receive electromagnetic energy in a radio frequency range used by geostationary satellites to receive signals from the earth. In other words, the observation satellite may be used for obtaining information about electromagnetic energy emitted from the earth for the purpose of satellite communications whatever the radio frequency.

In one embodiment, the at least one receiving antenna of the observation satellite is suitable to receive electromagnetic energy having at least one of: a linear polarization; a vertical polarization; a horizontal polarization; an elliptical polarization; and a circular polarization. This embodiment is advantageous since it may be useful to obtain information about the polarization of the received electromagnetic energy.

In one embodiment, the at least one receiving antenna of the observation satellite is configured to receive, during one orbital period, electromagnetic energy from an area covering more than half of the surface of the earth.

In one embodiment, the received electromagnetic energy comprises more than only information intended for controlling the observation satellite itself. The observation satellite indeed aims at gathering information about signals intended to satellites other than the observation satellite. The observation satellite aims at gathering information about signals intended to the so-called target satellites, as mentioned above.

In one embodiment, the received electromagnetic energy comprises energy intended for at least one other satellite. The signals for controlling the observation satellite itself may be transmitted in a specific frequency band, or through other means as will be explained thereafter. Thus, in this embodiment, the electromagnetic energy received by the observation satellite is not a control signal for the observation satellite.

In one embodiment, the observation satellite orbits the earth in an orbit having an inclination larger than 175° (175 degrees) and smaller than 185° (185 degrees). In such an orbit, the observation satellite moves in particularly advantageous orbit to receive electromagnetic energy transmitted in the direction of the geostationary orbit.

In one embodiment, the observation satellite orbits the earth in an orbit having an apogee differing by no more than 4000 kilometers from the geostationary orbit. In this orbit, the observation satellite is able to receive electromagnetic energy that closely corresponds to the actual electromagnetic energy reaching the geostationary orbit. This therefore enables the observation satellite to obtain data to provide a good estimation of the actual electromagnetic energy reaching the geostationary satellites.

In one embodiment, the observation satellite orbits the earth in an orbit having an apogee being any one of: between 31700 and 34700 kilometers above mean sea level, and between 36700 and 39700 kilometers above mean sea level. In this orbit, the collision risk with the geostationary satellites themselves and other resident space objects (RSOs), including space debris, is further minimized, based on the current public catalog of objects in orbit.

In one embodiment, the observation satellite orbits the earth in an orbit having an eccentricity being smaller than 0.05.

In one embodiment, the observation satellite is not itself a communication satellite for relaying end user information from one point of the earth to another point on the earth. Hence, in this embodiment, the observation satellite operates independently from existing communication satellites. The observation satellite, as an independent entity, also thus provides the capability to monitor spectrum between existing geostationary satellites, in vacant orbital locations along the arc. This allows for the evaluation of spectrum environment in advance of deploying a satellite asset to a given location, which could inform spectrum planning and fleet deployment decisions. This shows that, in some embodiments, the observation satellite can be used beyond interference management.

In one embodiment, the observation satellite's transmitter is configured for transmitting (or retransmitting) using at least one of: (a) downlinking the data (i.e., the data corresponding to above-mentioned cases (i), (ii) or (iii), or any combination thereof) by use of specific dedicated microwave frequencies; (b) downlinking data utilizing a transmitter able to dynamically adjust its transmission frequency band; (c) transmission using low-level spread spectrum; (d) at least one optical communication link; and (e) a store and forward method wherein the transmission (or retransmission) is delayed from the reception of the signal.

In one embodiment, the satellite further comprises a receiver connected to at least one receiving antenna, the receiver having sufficient spectrum agility and capability to be reconfigured to different frequencies across a broad range of the radio frequency spectrum. Thus, the satellite can receive electromagnetic energy in a broad frequency range as opposed to existing satellites.

The invention also relates to a satellite for obtaining information about electromagnetic energy emitted from a source, or from sources, on the earth. The satellite orbits the earth in an orbit having an inclination larger than 90° (i.e., 90 degrees) and smaller than 270° (i.e., 270 degrees). The satellite comprises means for receiving, while the satellite is orbiting relative to the surface of the earth, electromagnetic energy in the radio frequency range, from a source, or from sources, on the earth using at least one receiving antenna having a receiving pattern directed towards the earth. The satellite also comprises transmitting means for at least one of: (i) retransmitting at least part of the received electromagnetic energy; (ii) transmitting information representing at least part of the received electromagnetic energy; and (iii) transmitting information derived from at least part of the received electromagnetic energy.

In one embodiment, a plurality of satellites as described above are used together in order to obtain information about electromagnetic energy emitted from a source, or from sources, on the earth.

The invention also relates to a method for operating a satellite, or a plurality of satellites, as described above.

The invention also relates to a system comprising at least one observation satellite according to any one of the preceding embodiments, at least one ground station configured for obtaining, from the at least one observation satellite, the received electromagnetic energy or the information representing, or derived from, the received electromagnetic energy, and at least one processing station. The at least one processing station is configured for estimating, from the received electromagnetic energy or the information representing, or derived from, the received electromagnetic energy obtained by the at least one ground station, at least one of: (a) the composition of at least part of the received electromagnetic energy; (b) a location on earth of the origin of at least part of the received electromagnetic energy; (c) a level of received electromagnetic energy reaching at least part of the geostationary orbit; and (d) at least one characteristic of an uplink transmission.

In the above-described system, the processing station is located on earth. The invention is not however limited to such configuration. As explained above, the processing may also for example be entirely or partially carried out in the observation satellite or in another satellite.

When more than one observation satellite is employed, the amount of received electromagnetic energy can be increased. Furthermore, the response time, i.e. the time from requesting an action from the system to the corresponding answer, can be reduced.

The invention also relates to a method comprising: obtaining, by at least one ground station, a signal originating from a satellite (here referred to as "observation satellite", as mentioned above) orbiting the earth on an orbit having an inclination larger than 90° (90 degrees) and smaller than 270° (270 degrees). The signal conveys at least one of: (i) electromagnetic energy received by the observation satellite, (ii) information representing electromagnetic energy received by the observation satellite, and (iii) information derived from electromagnetic energy received by the observation satellite. The method also comprises: estimating, by at least one processing station, from at least part of the received electromagnetic energy or the information representing, or derived from, at least part of the received electromagnetic energy obtained by the at least one ground station, at least one of: (a) the composition of at least part of the received electromagnetic energy; (b) a location on earth of the origin of at least part of the received electromagnetic energy; (c) a level of received electromagnetic energy reaching at least part of the geostationary orbit; and (d) at least one characteristic of an uplink transmission.

In the context of the above-described method, the processing station is located on earth. As already mentioned above however, the invention is not limited to such configuration. The processing may also for example be entirely or partially carried out in the observation satellite or in another satellite.

In one embodiment, estimating the location comprises estimating a longitude and latitude. In such a manner, the location of the origin (i.e., source) of the electromagnetic energy can be determined. Determination of the source of the electromagnetic energy may then enable the removal of the interference for example by a satellite operator contacting the operator of a transmitting station to stop transmission or by an operator of a transmitting station effecting necessary repairs of malfunctioning or misaligned equipment.

In one embodiment, estimating a location on earth of the origin of at least part of the received electromagnetic energy comprises estimating the location of an interference source.

In one embodiment, estimating at least one characteristic of an uplink transmission comprises estimating an uplink pattern of at least one of an antenna on earth and a group of antennas on earth.

The invention also relates to a method for operating an observation satellite, to the use of an observation satellite for the above-mentioned purposes (i.e., for estimating: (a) the composition of at least part of the received electromagnetic energy; (b) a location on earth of the origin of at least part of the received electromagnetic energy; (c) a level of received electromagnetic energy reaching at least part of the geostationary orbit; and (d) at least one characteristic of an uplink transmission).

BRIEF DESCRIPTION OF THE DRAWINGS

Embodiments of the present invention shall now be described, in conjunction with the appended Figures in which:

FIG. 6 schematically illustrates a highly inclined satellite, i.e. in a retrograde orbit, in one embodiment of the invention;

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive.

Figure 1:
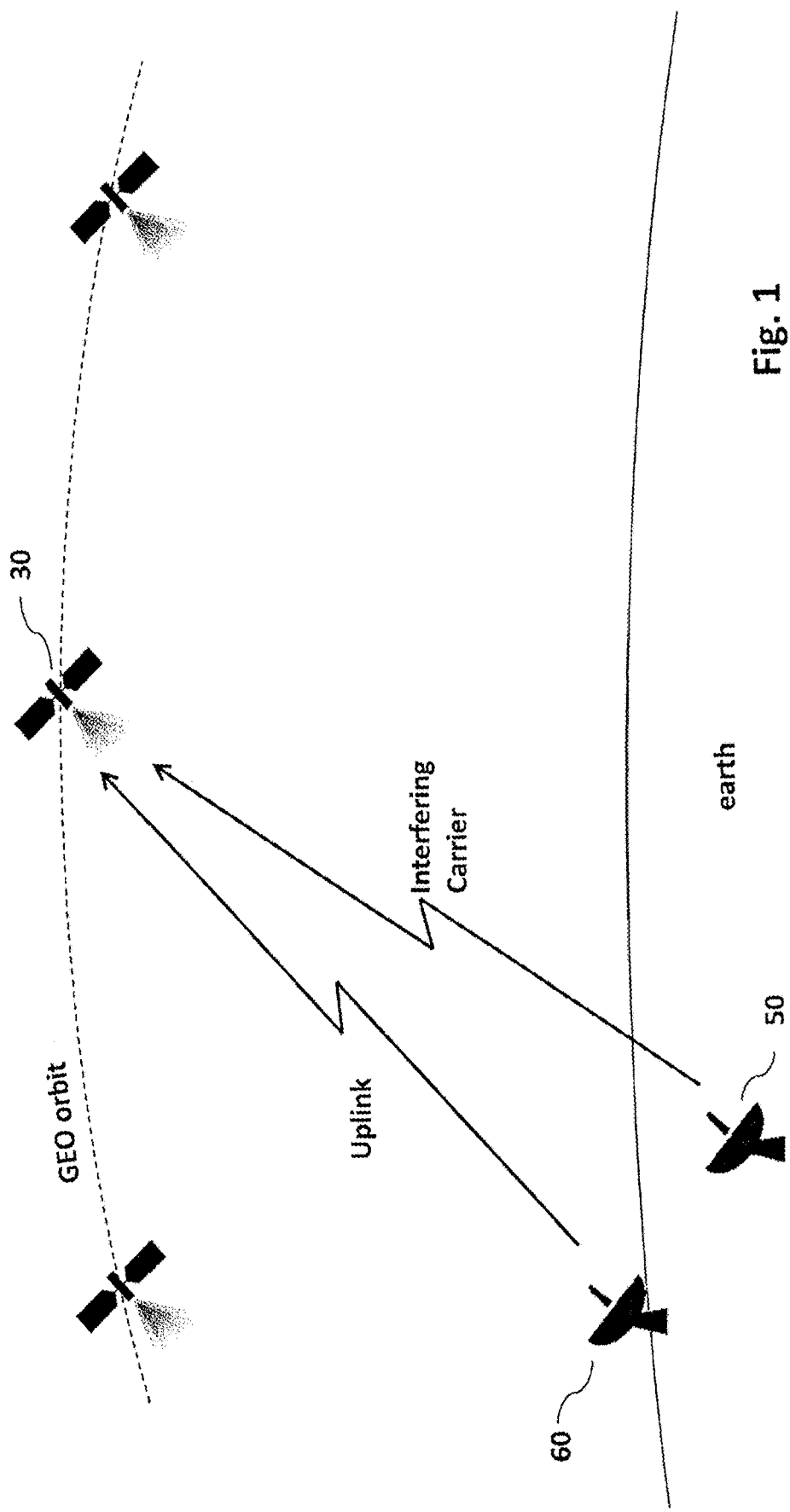
FIG. 1 schematically illustrates an exemplary scenario in which a satellite experiences interference.

FIG. 1 schematically illustrates a satellite 30 orbiting the earth on a geostationary orbit (labelled "GEO orbit" on FIG. 1), in order to understand problems that some embodiments of the invention address.

Satellite 30 receives an uplink signal (labelled "Uplink" on FIG. 1) from a ground station 60 (for example voice or data to be relayed towards another point on earth). Additionally, another ground station 50 transmits electromagnetic energy (labelled "Interfering carrier" on FIG. 1) towards the location of satellite 30 due to, for example, a misdirected satellite dish (i.e., mis-pointed antenna) or because the radiation pattern of ground station's 50 antenna is not directive enough (for example because its main lobe is too broad, because a side lobe is incidentally in the direction of satellite 30, or because the transmitting power is too high). The electromagnetic energy transmitted from ground station 50 may be intended for an adjacent satellite but partially reaches satellite 30. The electromagnetic energy transmitted from ground station 50 appears as interference for geostationary satellite 30. The interference may disturb the normal operation of the satellite 30, for example by reducing the usable capacity of the satellite link, e.g. in terms of data throughput, useable bandwidth, useable power on a given transponder, noise floor stability, etc.

On FIG. 1, the distance between the satellite's 30 orbit (illustrated by the dashed line) and the curvature of the earth surface (illustrated by the plain line) are schematic and not to scale. Likewise, the depicted ground stations and the satellite are not to scale either. These remarks apply likewise to FIGS. 2, 3, 4, 5, 6, and 10.

Figure 2:
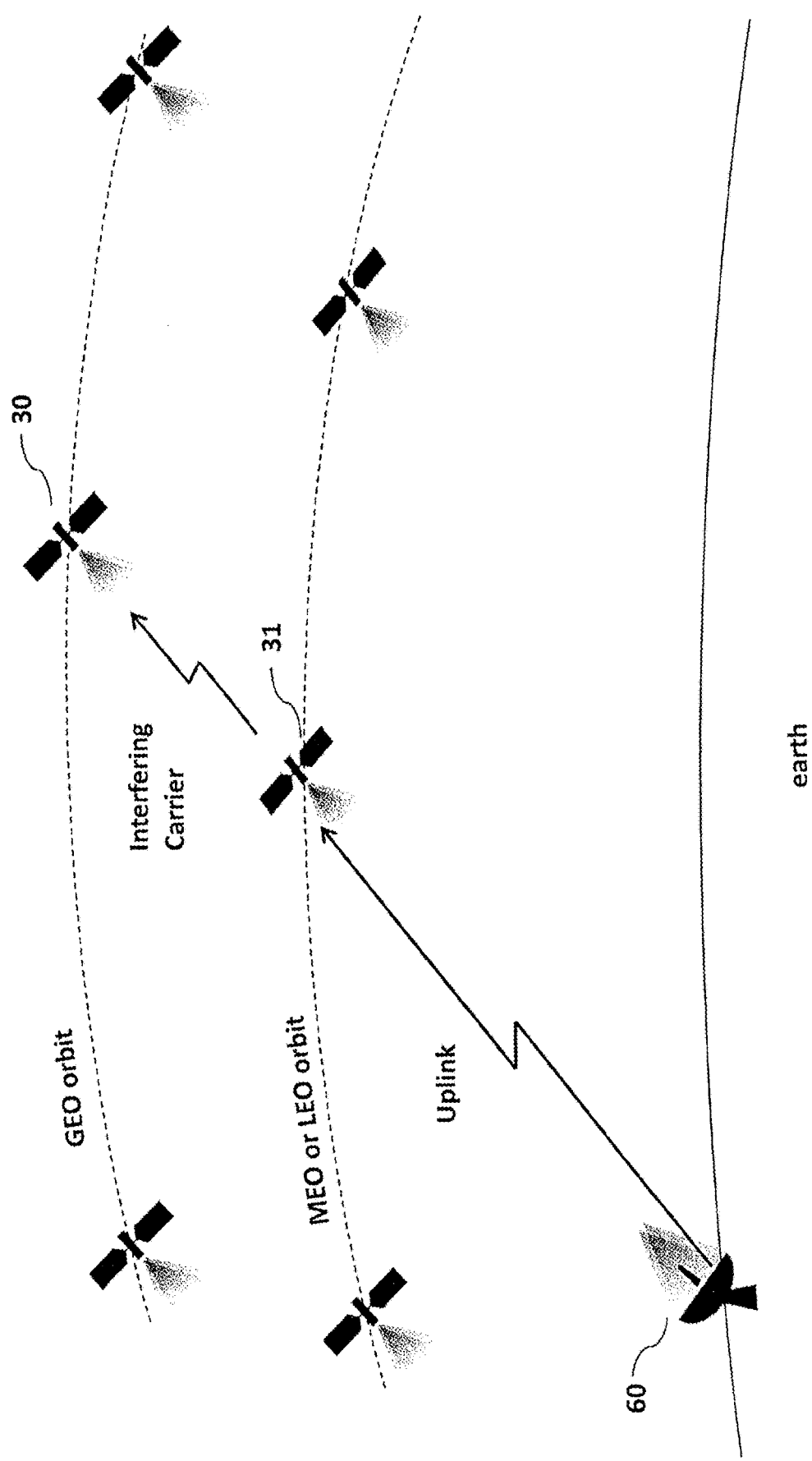
FIG. 2 schematically illustrates another exemplary scenario in which a satellite experiences interference.

FIG. 2 schematically illustrates another scenario in which the satellite 30 experiences interference, in order to understand problems that some embodiments of the invention address.

In this case, a ground station 60 transmits an uplink signal to a satellite 31 travelling in a lower orbit than satellite 30. For example, satellite 31 is in a low earth orbit (LEO) or a medium earth orbit (MEO) and satellite 30 is in a geostationary orbit. Although the uplink signal is not intended for satellite 30, the electromagnetic energy carrying the uplink signal reaches satellite 30 since, at least at one point in time, satellites 30, 31 are in the same line of sight seen from ground station 60. Therefore, satellite 30 may experience an interference. The same problem may occur when satellite 31 is travelling in a higher orbit compared to satellite 30. Such a situation is for example discussed in Thomas J. Lang, "*Conjunction/Interference Between LEO and GEO Comsats*", Proceedings of the AAS/AIAA Astrodynamics Specialist Conference held in Sun Valley, Id., 4-7 August 1997, AAS Paper 97-668.

Figure 3:
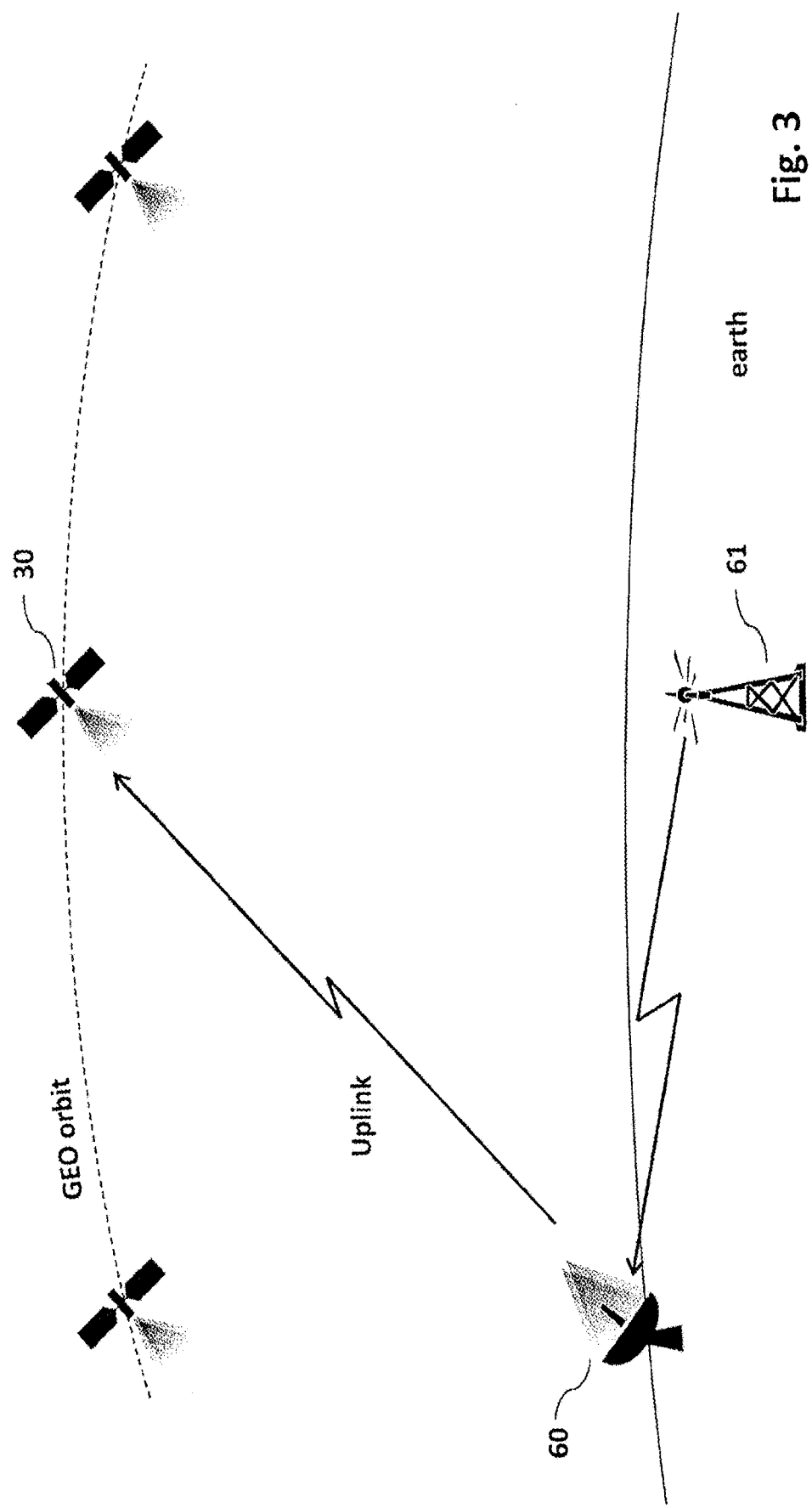
FIG. 3 schematically illustrates an exemplary scenario in which operation of a satellite is disturbed by a ground station picking up a terrestrial transmission.

FIG. 3 schematically illustrates another scenario in which operation of a satellite may be disturbed, in order to further understand problems that some embodiments of the invention address.

A base station 61, for example used in a mobile communication system, broadcasts a signal to mobile devices or other base stations. This transmission is incidentally captured by a ground station 60. In other words, ground station 60 unintentionally includes the transmission in an uplink sent to satellite 30. Hence, satellite 30 receives electromagnetic energy which not only comprises an uplink signal for satellite 30 but also a part not intended for satellite 30.

The occurrence of this type of interference phenomenon has been recognized by spectrogram analysis. Indeed, it has been shown in the past that, for example, a GSM rebroadcast may occur as evidenced by a spectrogram analysis clearly showing the timing correction bursts. In GSM indeed, a timing burst is sent after every tenth frame. Since each GSM frame is 4.615 ms, the timing burst has been seen every 46.15 ms. This situation may occur in some circumstances for example if a mobile communication cell tower (base station) is close to a VSAT uplink antenna (such as a few hundred meters from each other). The VSAT uplink antenna is then susceptible of capturing and retransmitting signals from the mobile communication cell tower towards the geostationary orbit.

Now that some exemplary interference scenarios have been explained with reference to FIGS. 1 to 3, embodiments of the invention will be described in more detail.

Figure 4:
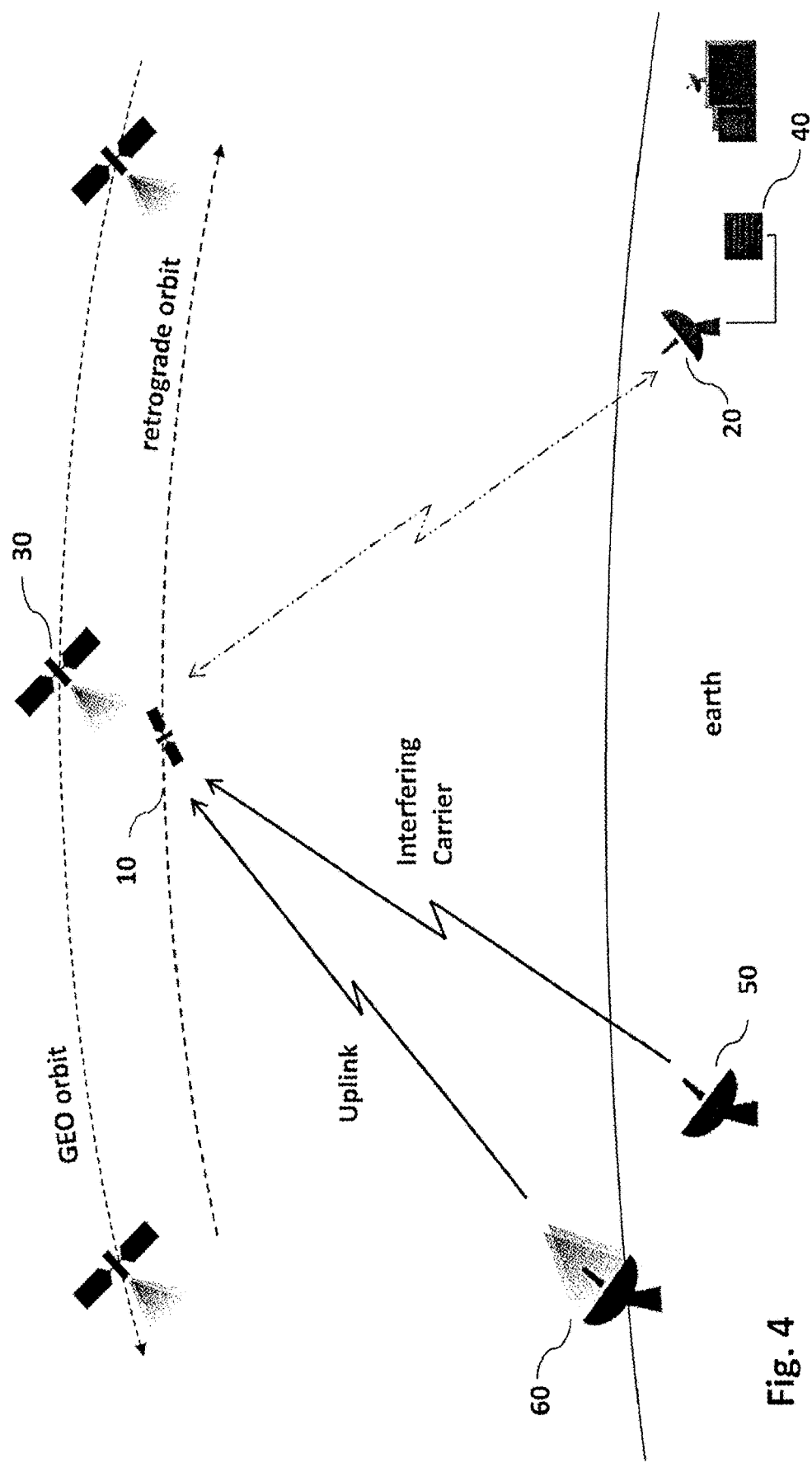
FIG. 4 schematically illustrates an observation satellite in a retrograde orbit and another satellite, in one embodiment of the invention.

In one embodiment, an observation satellite 10 is used to obtain information on the electromagnetic energy reaching a satellite 30 (which is for example a geostationary satellite) or, more generally, reaching an orbit or group of orbits. In that respect, FIG. 4 schematically illustrates an observation satellite 10 in a retrograde orbit (although several observations satellites 10 may also be used), a ground station 20 receiving transmissions from and transmitting control signals to observation satellite 10, a processing station 40 processing the received transmissions, a satellite 30 in a geostationary orbit, a transmission station 60 transmitting an uplink signal towards satellite 30 and a transmission station 50 incidentally transmitting electromagnetic energy towards satellite 30. In the example shown in FIG. 4, it is assumed that satellite 30 is in a geostationary orbit, although the invention is not limited to this scenario.

Observation satellite 10, which orbits the earth in a retrograde orbit, is able to receive the transmissions from ground stations 50, 60. Further, observation satellite 10 sends information about the received electromagnetic energy to a ground station 20. The information is then used in a processing station 40 for processing, for example to derive various kinds of information. For example, processing station 40 may determine the location of interfering ground station 50 so as to be able to adjust the satellite dish of ground station 50 or to be able to adapt the receiving pattern of the antenna of satellite 30 to avoid receiving the undesirable signals from ground station 50 (for example by generating a null in the direction of interfering ground station 50).

Figure 5:
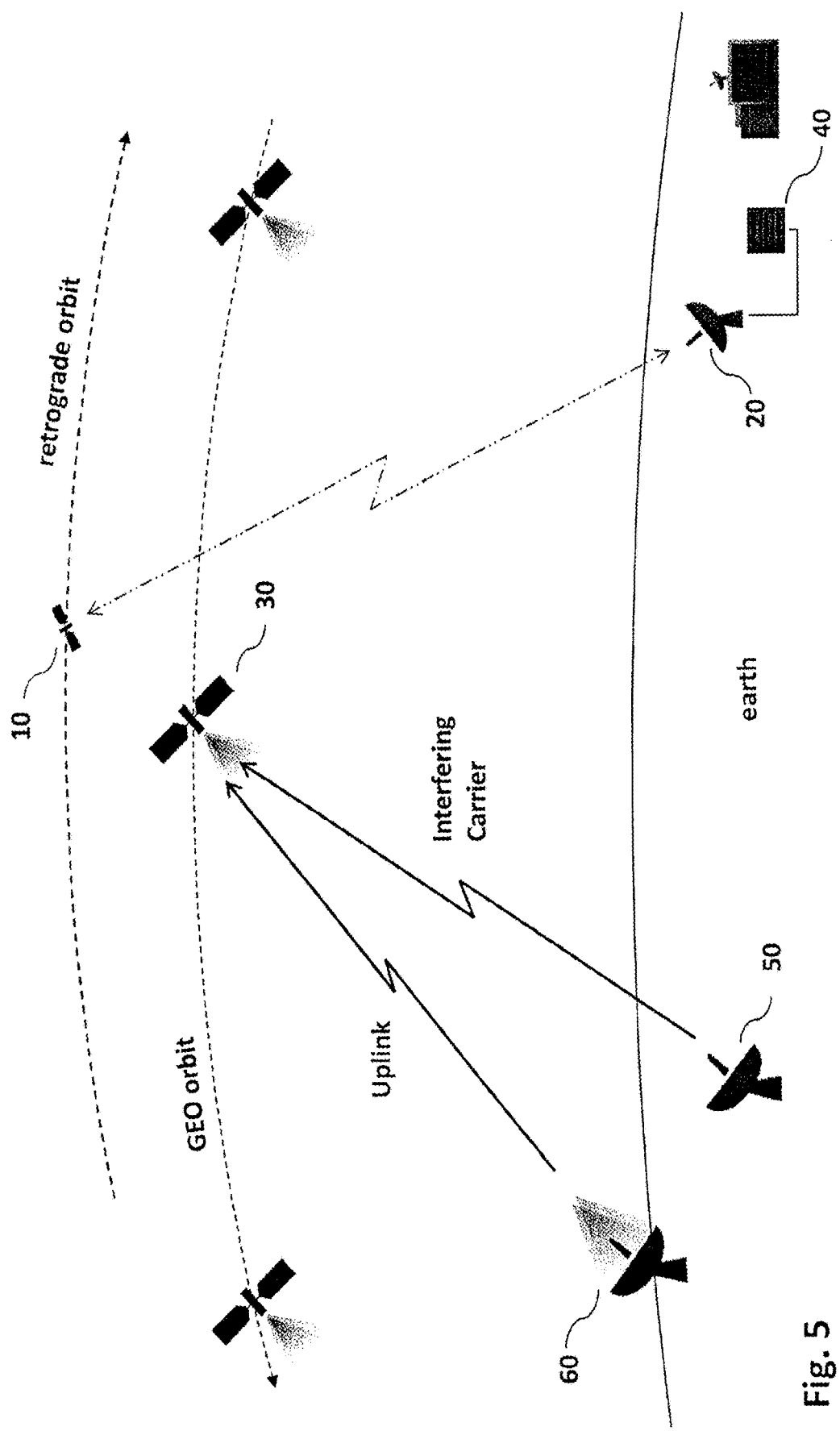
FIG. 5 schematically illustrates an observation satellite in a retrograde orbit and another satellite, in one embodiment of the invention.

FIG. 5 schematically illustrates a configuration in which observation satellite 10 orbits at an altitude greater than the geostationary orbit, rather than lower than the geostationary orbit. Besides, the configuration illustrated by FIG. 5 is similar to the one illustrated by FIG. 4.

The advantages of using a retrograde orbit for observation satellite 10 will now be explained in more detail.

Retrograde Orbit

To achieve maximum value of a satellite with spectrum sensing capabilities (i.e., an observation satellite), some embodiments of the present invention extends sensing coverage to as many satellites as possible. Typically the motion of a satellite relative to other satellites in a given orbit requires expending fuel, resulting in a shortened lifespan, increased spacecraft cost, or that the speed of relative drift be slow. Theoretically one could orbit very quickly relative to other satellites at the appropriate altitude if the satellite were to expend fuel continuously. However, this is not practical and probably not even feasible with current technology. Therefore, the possible drift rate, while also maintaining the advantageous vantage point altitude, would be at such a slow rate as to extremely limit the value of the system. While a slow drift rate may fit the more strategic value-added needs, since fleet deployment and spectrum development operate on long time scales, a slow drift rate also precludes it as an operational monitoring platform suitable for responsiveness to active communications transmissions since it could take months to re-deploy the asset to the needed orbital location. For this reason, and to maximize the number of satellites served, the proposed solution is for observation satellite 10 to operate in an alternative retrograde orbit at near geo-synchronous altitude, orbiting the Earth counter to the natural rotation about its axis. A retrograde orbit is here understood as being an orbit having an inclination larger than 90° and smaller than 270°.

The use of satellites orbiting on a retrograde orbit is known, but for other applications and configurations. For example, US 2008/0081556 A1 relates to placing a satellite in a retrograde orbit for observing and inspecting satellites.

Preferably, the inclination of the retrograde orbit is between 175° and 185° such that the observation satellite 10 moves close to the equatorial plane. An additional schematic illustration of a retrograde orbit is shown in FIG. 6. This orbit has the advantage of continuous and natural motion relative to geosynchronous satellites 30, and provides a reasonable frequency of flyby for each geosynchronous spacecraft of interest. The retrograde orbit allows measurement at the appropriate altitude without the need for expending significant fuel. More specifically, the retrograde orbit enables the desired revisit rate and vantage point as natural motion such that the only fuel necessary is that which is required to achieve and maintain the orbit for the lifetime of the satellite (similar to all other satellites). The altitude is preferably similar to geostationary satellites 30, plus or minus up to several thousand kilometers in order to provide a buffer of safety for conjunction with other satellites at that altitude. The altitude is significant to the sensing operations of the observation satellite 10 because being at a similar altitude allows the observation satellite 10 to monitor the same transmissions—or almost the same transmissions—that the geostationary satellites 30 receive. If the spacecraft's altitude was too high or too low, it would potentially miss some transmission signals (from antennas with low elevation angles on earth) and it would potentially receive unwanted microwave energy.

In case the altitude of the observation satellite 10 is approximately the same as geostationary satellites 30, i.e. the observation satellite 10 for example orbits the earth in an orbit having an altitude differing by no more than 4000 kilometers from the geostationary orbit, the orbital period remains approximately one satellite rotation every twenty-four hours. However, since the earth's rotation and geostationary satellite's orbit would be equal in magnitude but opposite in direction, the observation satellite 10 passes each geostationary satellite 30 roughly twice per twenty-four hours. The orbit can be also described as a prograde geosynchronous type with an inclination of 180 degrees. The rapid frequency of arrival at each geostationary satellite 30 and extensive coverage across the entire arc thus makes a single observation satellite 10, with its microwave sensing capabilities, capable of serving an entire fleet.

Since a retrograde orbit is not useful in a traditional geosynchronous satellite communications sense, few retrograde launches have been performed. Additional energy is required to launch a retrograde satellite from the surface of the Earth since one has to reverse the momentum provided by the natural rotation of the Earth to achieve an orbit in the opposite direction.

The most straightforward launch approach is to launch westward from the surface of the earth, accounting for additional thrust to achieve the necessary delta-v in the retrograde direction. However, since most launches are prograde, launch sites are located for favorable eastward launch conditions (a large body of water directly to the east). An additional approach is a more traditional eastward launch into a super-synchronous transfer orbit and utilizes propulsion on board the spacecraft to increase the inclination to 180 degrees over time. Such launches however should not be considered as the only means for achieving such an orbit.

Another launch approach is to use the moon to perform a lunar swing-by and 'reverse' direction relative to the rotation of the earth, as discussed for example in Aravind, R., et al, "*Mission to Retrograde Geo-equatorial Orbit (RGEO) using lunar swing-by*", 2012 IEEE Aerospace Conference (3-10 March 2012), pp. 1-8.

Satellite Composition

Figure 7:
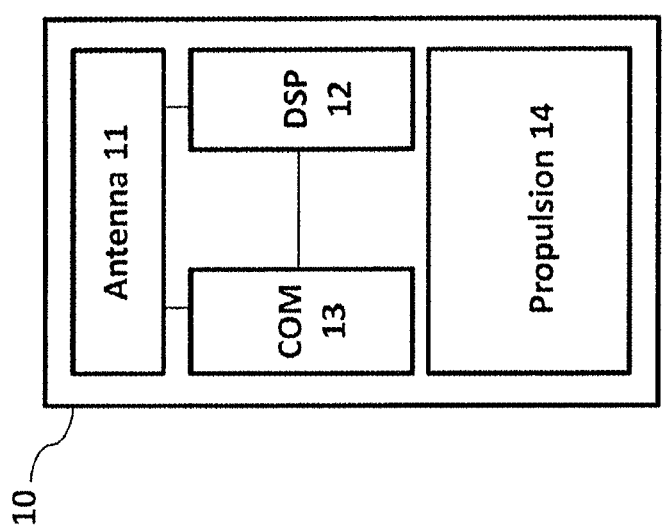
FIG. 7 schematically illustrates the composition of an observation satellite in one embodiment of the invention.

FIG. 7 schematically illustrates the composition of an observation satellite 10 in one embodiment of the invention. The observation satellite 10 and its equipment may be built on top of an existing spacecraft bus, including the power, propulsion, control, thermal, and other subsystems. The specialized payload (i.e., equipment) could comprise the following major subsystem components: receive-only arrays 11 and controlling components 12 (control unit) necessary for enabling space-based geolocation, spectrum processing and analysis hardware, a communications subsystem 13 (labeled "COM" on FIG. 7) to receive commands from the ground and download processed data (temporarily storing data for transmission if necessary) and telemetry, and a propulsion system 14. The propulsion subsystem is depicted specifically due to the significance of this subsystem in achieving the prescribed orbit, depending on the method of launch. However, the observation satellite 10 may not contain all the above mentioned subsystems and could contain additional subsystems in other embodiments.

The antenna 11 has a receiving pattern directed towards the earth and is suitable for receiving electromagnetic energy in the radio frequency range. The received electromagnetic transmission may comprise an intentionally transmitted signal and/or noise-like transmissions. Preferably, the antenna 11 is suitable for receiving transmissions in a range used by communication satellites, e.g. L-band (1 to 2 GHz), S-band (2 to 4 GHz), C-band (4 to 8 GHz), X-band (8 to 12 GHz), $K_u$-band (12 to 18 GHz), and $K_a$-band (26.5 to 40 GHz). The antenna 11 may be suitable for receiving electromagnetic energy with any types of polarization (e.g., linear, vertical, horizontal, elliptical and circular) or only some types of polarization. Furthermore, the receiving pattern is directed towards the earth when the observation satellite 10 is correctly positioned, i.e. the observation satellite 10 stably orbits the earth.

Furthermore, the control unit 12 may obtain information about the modulation scheme of the received electromagnetic energy (e.g. phase-shift keying, quadrature amplitude modulation, time division multiple access, code division multiple access, frequency division multiple access).

For communications between the observation satellite 10 and the ground, including command carrier, telemetry and data download link, one of the below techniques may for example be used:
(a) Downlinking the data by use of specific dedicated microwave frequencies. Typically the data downlink frequencies are different than those normally used by communications satellites 30 being analysed in order to avoid causing interference.
(b) Downlinking data utilizing an RF transmitter able to dynamically adjust its transmission frequency band so as to avoid interference to nearby satellites as the observation satellite 10 moves. This could be a pre-scheduled sequence or autonomous.
(c) Transmission using low-level spread spectrum. Utilizing spectrum which is (or is not) already in use and transmitting a very low level signal. The data rate is greatly reduced per MHz, but it results in a negative carrier to noise (C/N) ratio and thus has minimal effect on any traffic being transmitted at the same frequencies.
(d) An optical channel. In this case, more than one ground station 20 may be needed to ensure stable downlink communication since clouds and other weather phenomena may interrupt the optical link.
(e) A store and forward method, using any of the above methods but storing data from other parts of the orbit and downlinking later in a different part of the orbit (for example at a place with fewer frequency ranges already in use and high data throughput could be achieved).

Regarding the downlink communication from the observation satellite 10, any above methods may be used by:
(1) 'Wide' area transmission, covering a part of or the entire earth from the satellite's vantage point.

(2) Small beam tracking antennas on-board which track a number of ground stations, thus maximizing power/throughput, as well as streamlining coordination and enhancing data-security.

(3) A transmission link to another satellite acting as a data relay.

Figure 10:
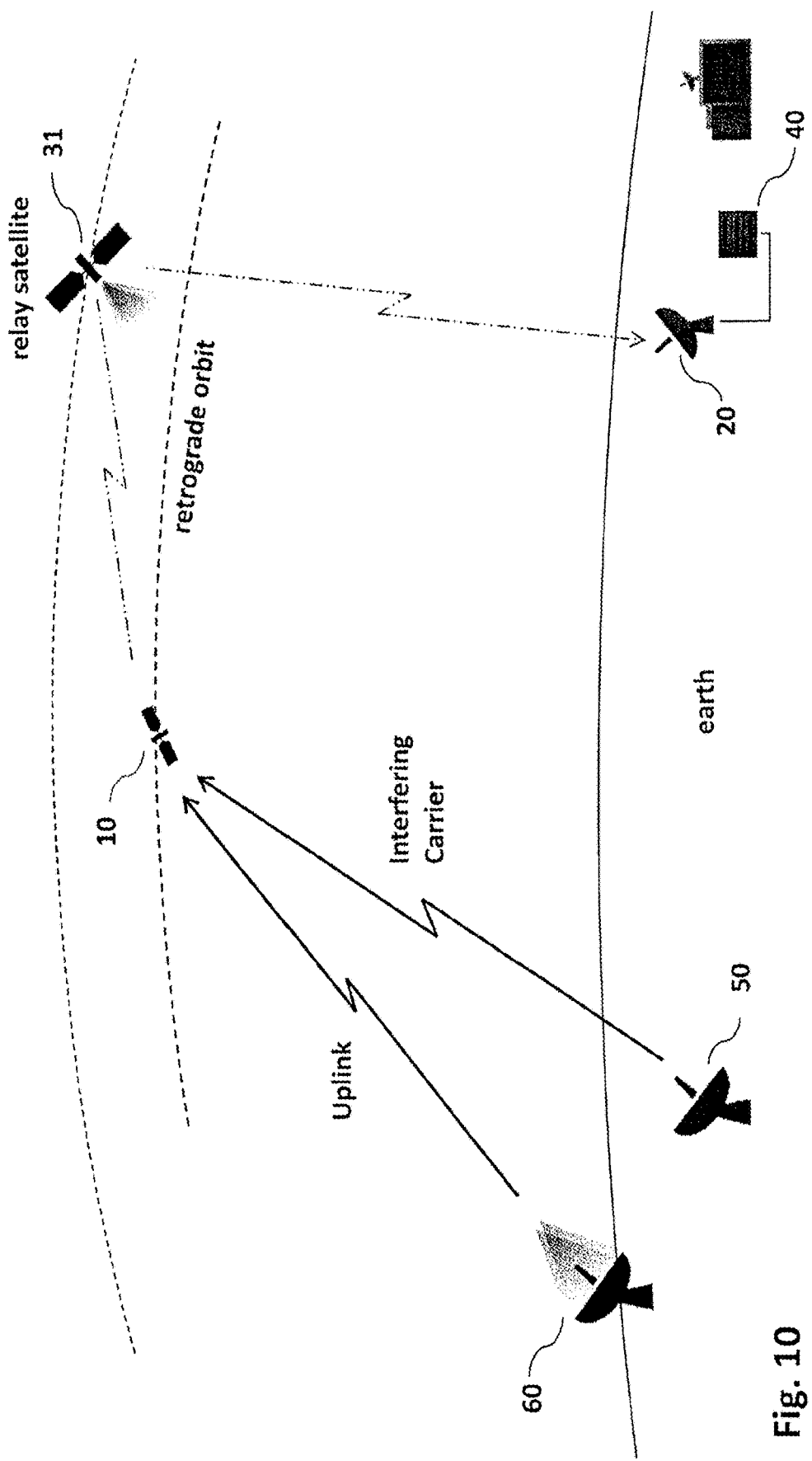
FIG. 10 schematically illustrates a transmission from a satellite via a relay.

The third alternative is schematically illustrated in FIG. 10. Observation satellite 10 uses a relay satellite 31 to send a downlink transmission to ground station 20. More specifically, observation satellite 10 transmits towards satellite 31. The relay satellite 31 then relays the transmission towards ground station 20, possibly after some processing. Observation satellite 10 may transmit, to relay satellite 31, through an optical link (i.e., optical satellite-to-satellite transmission).

Figure 8:
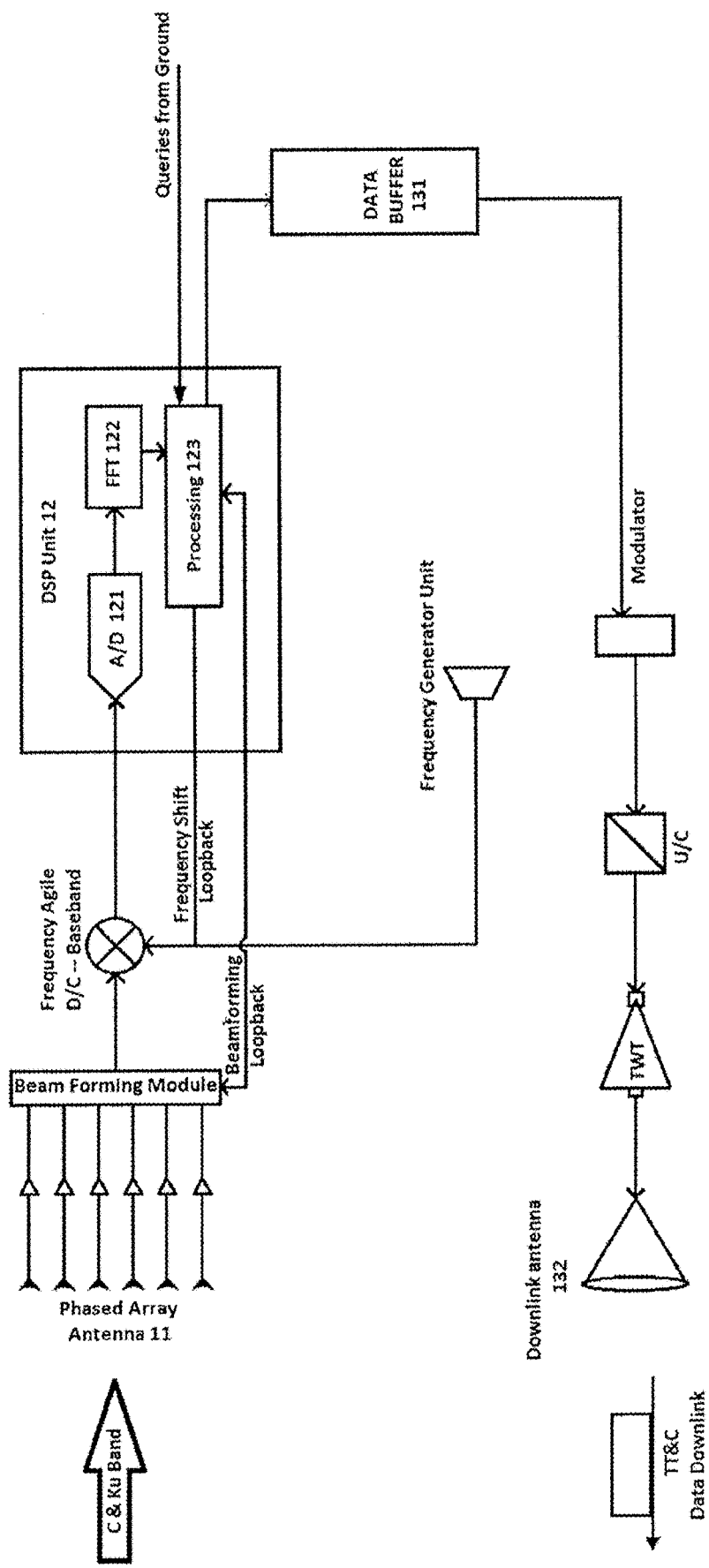
FIG. 8 schematically illustrates the composition of an observation satellite payload in one embodiment of the invention.

FIG. 8 schematically illustrates the composition of an observation satellite 10 in one embodiment of the present invention. In this embodiment, the observation satellite 10 receives electromagnetic energy in the C and $K_u$ band using a phased array antenna 11. The received electromagnetic energy is then converted to a common frequency suitable for the digital signal processor. An A/D converter 121 digitalizes the analog signal. Fast-Fourier processing is performed on the signal from the A/D converter 121 in a FFT unit 122. A processing unit 123 may further process the output from the FFT unit 122 before it is stored in a buffer 131. The data stored in the buffer is transmitted to a ground station 20 via a downlink antenna 132.

The invention is however not limited to the exemplary implementation illustrated by FIG. 8. FIG. 8 illustrates a simple implementation and only serves to exemplify a functional hardware configuration for one approach. Many other possible implementations may be used.

Space-Based Geolocation

Space-based geolocation means to determine a location on the surface of the earth by means of an object in space. For doing so, many possible direction finding (DF) techniques are possible. One possible mechanical implementation may, for example, involve rotating the spacecraft until the transmission signal is at its strongest, so that the orientation of the spacecraft is parallel to the transmitted signal vector. More sophisticated approaches have more complex electronic and/or mechanical steps. Some additional approaches are described below.

From the natural vantage point in space, observation satellite 10 can observe and monitor nearly all uplink transmissions to geostationary satellites and gather relevant information regarding the directivity of uplink signals. The directivity of incoming uplink signals to a geostationary satellite is typically difficult to ascertain from the ground after the signal has been received and retransmitted by a communications satellite.

In orbit, determination of uplink locations can be achieved in a more straightforward manner compared to ground-based geolocation by directly resolving the incident angle of the transmission to the spacecraft and, given the spacecraft attitude and position, thus the location on the surface of the earth. This approach has significant advantages to the ground-based approach because it is not subject to the limitation of relying on external sources of data and is a more robust determination method since it measures uplink energy directly, rather than relying on frequency and temporal Doppler shift from the downlink signals of adjacent satellites. This space-based geolocation capability allows for the localization of unauthorized uplink locations transmitting to a spacecraft and causing interference to contracted traffic and contaminating spacecraft capacity.

Performing space-based geolocation can be performed with a multitude of techniques and hardware solutions. Four main technique classifications may for example be considered, namely: (T1) Direction finding (DF) utilizing 'nulling' of uplink sources by means of a flexible or steerable antenna pattern, (T2) Frequency of Arrival (FoA) or Doppler analysis by examining the frequency offset or change in frequency of an incident signal, (T3) Angle of Arrival (AoA) analysis by comparing the received signal (phase, amplitude, etc.) between two or more antenna elements, and (T4) Spectral estimation by correlation of impinging signals across elements in a multi-element array.

(T1) DF techniques generally utilize the gain characteristics of an antenna to determine a bearing to the impinging signal. By variation of the gain of an antenna in a given direction, either through mechanical movement or electrical means, the characteristics of a transmitted signal as received by the antenna may also vary, thus providing some understanding of the nature of the source of the transmitted signal. Variation of gain in a given direction could be accomplished for example, by a relative motion of the antenna with respect to the source of a transmitted signal by means of a gimble or natural motion, or by a dynamic variation of the gain pattern of an antenna by means of an electronically steerable antenna array. DF techniques are mature and many hardware implementations have been created to apply these techniques for various applications.

In one instance, DF techniques could be applied for space-based geolocation of uplink transmissions by equipping an observation satellite 10 with an antenna or antennas with a high gain slope characteristic and which cover a portion of the earth's surface as seen by the observation satellite 10. At any given point in orbit, the antenna patterns of the observation satellite 10 could be mechanically or physically moved around the surface of the earth to 'seek' the interfering carrier. This motion could be deliberately controlled or could process in a repeating pattern to provide coverage of the entire earth. Continuous monitoring of the signal levels in comparison to a reference level as the pattern shifts provides exact measurements as the footprint approached and moved away from the target signal. With sufficient knowledge of the antenna patterns themselves, the motion of antenna patterns and the spacecraft attitude, the vector towards the interfering signal source can be determined and the origin on the surface of the earth computed. Since this technique relies on direct energy measurement (rather measurement of the lack of energy while the transmitter entering or leaving a pattern 'null'), such a system would be robust and applied to a wide range of uplink signals.

Among the most flexible hardware solutions is to use active phased antenna arrays to electronically steer the footprint pattern on the surface of the earth. This has the advantage of no mechanically moving parts, and be adaptable to perform several types of searching functions (repeating pattern, dedicated seek, etc.). Other types of hardware implementations for the third proposed technique as described above include small spot beam antennas or antenna clusters which are mechanically moved or rotated on-board the spacecraft, or fixed antennas or antenna clusters with spacecraft nutation in roll, pitch, yaw or some combination thereof.

(T2) Frequency of Arrival or Doppler analyses could also be employed for performing space-based geolocation. Due to relative motion between the observation satellite 10 and a transmitting station 50, the frequency of the signal received at an antenna on the observation satellite 10 may be offset to the true frequency as transmitted by transmitting station 50. In addition, because of the orbital geometry the rate of change of the Doppler induced offset may also be changing. By comparing the frequency offset to a known reference, or by comparing the frequency offset between two elements onboard the spacecraft, or by analyzing the rate of change of the frequency offset as measured by the observation satellite, an understanding of the possible originating locations on the surface of the earth can be derived. The frequency offset may be particularly significant to observe due to the high relative velocity of the observation satellite 10 in a retrograde orbit.

For performing this methodology, the observation satellite 10 would require at least one receiving antenna, but may have more than one. Since this approach relies largely on analysis of frequency of the transmitted signal, there are few requirements of the onboard antenna patterns, gain and steer-ability. In addition, it is worth noting that this technique for space-based geolocation is dependent upon a stable transmission frequency or known variations in transmission frequency such that variations in the true frequency are not perceived as Doppler variations due to relative motion.

(T3) Space-based geolocation by angle of arrival analysis could utilize a plurality of antennas onboard the spacecraft with overlapping antenna patterns on the surface of the earth. Reference measurements between two antenna elements, as a simple example, may be one way to gain basic information about the angle of arrival of a signal. Consider two antennas, with overlapping but not identical reception patterns, such that the same signal received by the two antennas is received differently and at a different power level. Through knowledge of the reception characteristics of both antenna elements, a crude understanding of the possible direction of arrival can be determined because only a small portion of possible direction vectors would result in the observed signals for both antennas. This process can be refined and improved with more complex and a greater number of antennas to a useable degree.

By measuring amplitude and/or (more commonly) phase of a given signal by one or more of elements and comparing the differential in ratio to each other or to a reference measurement, an understanding of the incident angle of the source onto the antenna can be determined and the origin of the transmission sources can be derived. In this case, high gain, high slope and poor roll-off performance of the antenna functions are advantageous in achieving a high resolution and the measurement accuracy. The technique is relatively simple to implement and may provide robust measurements for a wide range of uplink signal types.

(T4) Spectral estimation techniques rely on measurement of signal sources impinging on an observation satellite 10 by multiple elements in an array. As a result, spectral estimation direction of arrival techniques require multiple antenna elements configured in a sophisticated array onboard an observation satellite 10 and pointing toward the earth, such that the antenna gain patterns overlap and the elements are spaced appropriately according to the intended signal of interest.

Measurements of the amplitude and phase of incident signals at a given frequency across each element can be correlated to produce an estimate of the composition of the incident signals, namely the angle of incidence on the array. Many measurements may be taken sequentially to statistically improve the characterization of a signal through averaging. Mathematically intensive processing can further improve performance through the use of sub-space methods, such as Multiple Signal Classification (MUSIC). Though computationally expensive and requiring a sufficiently large antenna array, some correlation approaches can provide high-fidelity estimates of the direction of arrival of a plurality of incident signals simultaneously. Sufficient knowledge of the antenna array and orientation and position of the observation satellite 10, space-based geolocation can be performed as the origin of each incident signal on the surface of the Earth can be derived.

The optimal solution may in fact incorporate multiple of the above techniques and indeed some techniques may be compatible to perform the analyses using the same spacecraft hardware. Synthesis of the output of multiple techniques as well as synthesis of sequential analyses as the observation satellite 10 moves and the incident angle of a given signal changes may produce superior performance.

With the exception of some Doppler offset measurements in technique (T2 or T3), it is worth noting that the space-based geolocation is not dependent on the retrograde (high relative velocity) motion of the spacecraft; but rather that the retrograde motion enables relatively rapid response time and coverage to perform space-based geolocation for each satellite orbiting in a prograde direction at a given altitude.

In one embodiment, which extends in a sense the concept of cooperation between a plurality of satellites as illustrated in FIG. 10, a fractionated spacecraft or multiple spacecraft working in tandem are used. For example, in one embodiment, a system involving a plurality of observation satellites is used. This may enable the use of smaller spacecraft each having at least one antenna element taking measurements simultaneously at some distance, and then communicating those signals to the larger spacecraft. The spacecraft may also be identically sized. It may be advantageous for performing space-based geolocation to have antennas which are spaced very far apart (i.e. synthetic aperture interferometry) and they need not be on the same spacecraft.

Ground-Based Geolocation with an Observation Satellite

In one embodiment, traditional ground-based time difference of arrival (TDOA) processing or frequency difference of arrival (FDOA) processing is used as a geolocation technique involving the observation satellite or satellites. Namely, the observation satellite acts as a secondary satellite to the target satellite for TDOA-FDOA measurements or two observation satellites in proximity may be used to perform ground-based TDOA-FDOA analysis of the signals. This involves transmitting the data corresponding to above-mentioned cases (i), (ii) or (iii), or any combination thereof (i.e., as discussed above, at least part of the received electromagnetic energy or the information representing, or derived from, at least part of the received electromagnetic energy) to the ground from the observation satellite(s).

This technique is identical to existing ground-based geolocation techniques, except that the technique involves one or more observation satellites in retrograde orbits which are specifically intended for assisting in signal analysis and determination of the origin of uplink signals. In that sense, the technique might also be called "space-based, ground-based geolocation".

System Composition

In addition to observation satellite 10, a system in one embodiment of the invention may include ground-based infrastructure and communications to relay processed data to the ground. Several ground stations 20 around the earth with tracking antennas would perform telemetry, tracking and communication (TT&C) functions as well as receive transmitted data from observation satellite 10. Horizon to horizon time for observation satellite 10 at an altitude near the geostationary orbit is approximately four hours, which is within a reasonable speed for existing antenna systems. At least three or four ground stations 20 are required to maintain constant communication with observation satellite 10. In addition to traditional spacecraft commanding and control, ground stations 20 also send any necessary payload commands or queries to observation satellite 10, directing the sensing operations to produce specific measurements as desired by users.

The data downloaded by observation satellite 10 may be large, and the reception and data storage chain on the ground is sized appropriately to handle a continuous flow of data from observation satellite 10 through a traditional demodulation and decryption reception chain. Data may be stored in one or more processing stations 40, fed from each ground station 20 sequentially as the satellite reception area changes. Depending on processing implementation on-board and the geolocation technique employed, an additional layer of processing would be performed at the centralized data center in order to produce the desired output and data format. Front end interfaces may allow users to direct payload commands to the observation satellite 10 through the ground stations 20 as well as allow access to the received and processed data.

Figure 9:
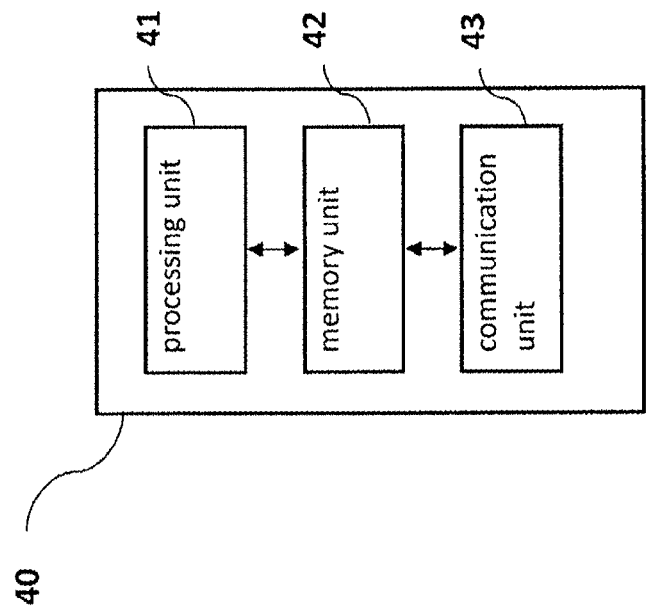
FIG. 9 schematically illustrates a composition of a processing station in one embodiment of the invention.

A processing station 40 in one embodiment of the invention is schematically illustrated in FIG. 9. As shown on FIG. 4, processing station 40 is located on earth. However, as explained above, since some processing may additionally or alternatively be performed within the observation satellite 10, or within another satellite, the same functions and/or units may also be incorporated, to the extent that this is necessary, within the observation satellite 10, or within another satellite.

Processing station 40 comprises a processing unit 41, a memory unit 42 coupled to the processing unit 41, and a communication unit 43 coupled to the processing unit 41.

Figure 11:
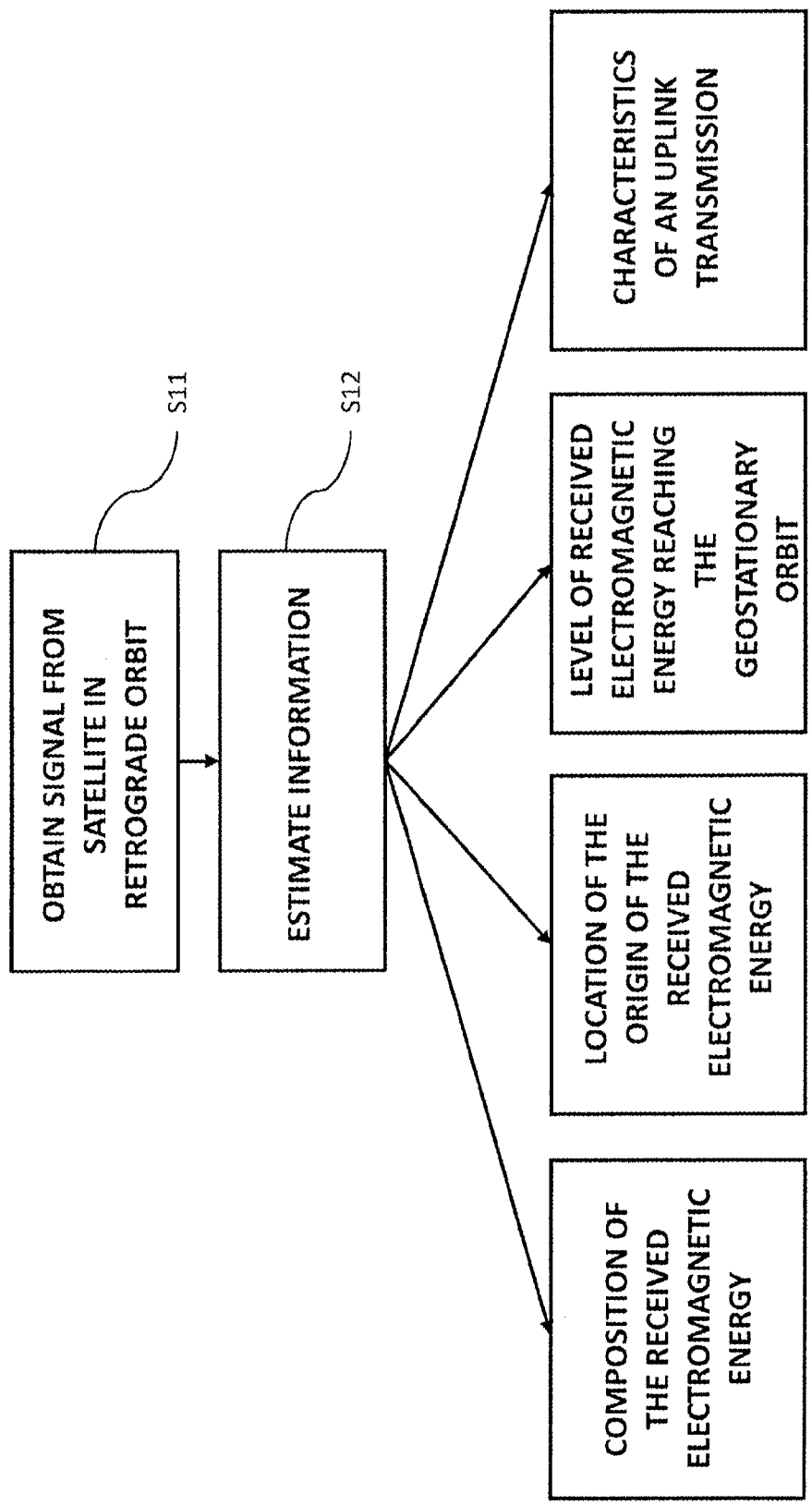
FIG. 11 schematically illustrates a method in one embodiment of the invention.

Processing unit 41 may include a processor, a microprocessor, or processing logic that may interpret and execute instructions, as those described in the present document (for instance with reference to FIG. 11). These operations may be performed in response to processing unit 41 executing software instructions contained in a computer-readable medium, such as memory unit 42. The software instructions contained in memory unit 42 may cause processing unit 41 to perform operations or processes described herein. Alternatively, hardwired circuitry may be used in place of or in combination with software instructions to implement processes and/or operations described herein. Thus, implementations described herein are not limited to any specific combination of hardware and software.

Memory unit 42 is configured to store transmissions from one or more observation satellites 10. Memory unit 42 may include a RAM or another type of dynamic storage device that may store information and instructions for execution by processing unit 41. Memory unit 42 may also include a ROM device or another type of static storage device that may store static information and instructions for use by processing unit 41. Memory unit 42 may also include a magnetic and/or optical recording medium and its corresponding drive.

Communication unit 43 is configured to communicate with one or more ground stations 20. Communication unit 43 may include any transceiver-like mechanism that enables processing station 40 to communicate with other devices and/or systems.

Memory unit 42 may store a computer program loadable into the processing unit 41 comprising code for executing the steps of the described method embodiments according to the present invention. Although not illustrated/for the sake of conciseness, a bus—including a path that permits communication among the components of processing station 40—, an input device—including a mechanism that permits an operator to input information to processing station 40, such as a keypad, a keyboard, a mouse, a pen, voice recognition and/or biometric mechanisms, etc.—and an output device—including a mechanism that outputs information to the operator, such as a display, a printer, a speaker, etc.—may also be included in processing station 40.

FIG. 11 is a flowchart of a method performed by the system in one embodiment. In step S11, at least one ground station 20 obtains a signal originating from an observation satellite 10 orbiting having an inclination larger than 90° and smaller than 270° (i.e., in a retrograde orbit), and conveying at least one of: (i) electromagnetic energy received by the satellite, information representing (ii) electromagnetic energy received by the satellite, and (iii) information derived from electromagnetic energy received by the satellite.

The information representing the received electromagnetic energy may be produced in observation satellite 10 by digitalizing and compressing the received electromagnetic energy. In the last alternative, the information derived from the received electromagnetic energy may be produced in the observation satellite 10 by determining the location (e.g. longitude and latitude) of the source of the received electromagnetic energy.

In step S12, at least one processing station 40 estimates from the received electromagnetic energy or the information representing, or derived from, the received electromagnetic energy obtained by the at least one ground station, at least one of: (a) the composition of at least part of the received electromagnetic energy; (b) a location on earth of the origin of at least part of the received electromagnetic energy; (c) a level of received electromagnetic energy reaching at least part of the geostationary orbit; and (d) at least one characteristic of an uplink transmission. In one embodiment, the ground station 20 and the processing station 40 may be collocated or form a single station.

The composition of at least part of the received electromagnetic energy may comprise the energy spectrum or polarization of the received electromagnetic energy. The location on earth of the origin of at least part of the received electromagnetic energy may comprise the longitude and latitude of the origin. The level of received electromagnetic energy reaching at least part of the geostationary orbit is useful for determining an interference map of the geostationary orbit. A characteristic of an uplink transmission may comprise the modulation scheme of the uplink transmission.

Figure 12:
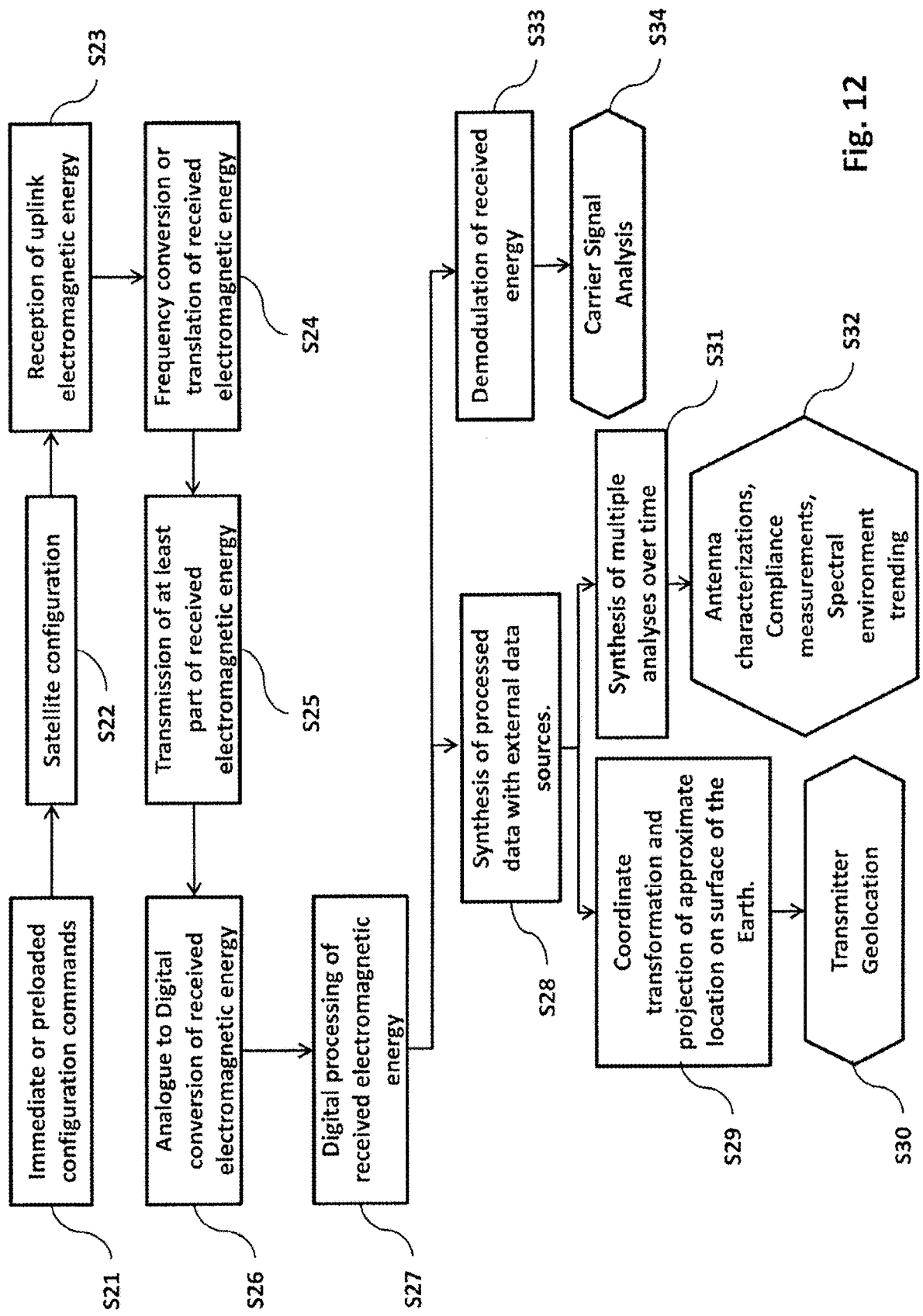
FIG. 12 schematically illustrates a method in one embodiment of the invention.

FIG. 12 is a flowchart of a method performed by a system in one embodiment of the invention.

In steps S21 and S22, immediate or preloaded configuration commands are executed and the satellite configuration is loaded. In step S23, the satellite receives uplink electromagnetic energy. The uplink electromagnetic energy may, for example, include energy intended for other satellites. In step S24, the received electromagnetic energy is subjected to a frequency conversion or frequency translation. Additional steps may include analogue to digital conversion, digital processing of received electromagnetic energy, data reduction or fusion of multiple sources of data, digital to analogue conversion, frequency translation, etc.

In step S25, at least part of the received electromagnetic energy is transmitted (for example towards a ground station on earth). The received electromagnetic energy is digitized in step S26 and digitally processed in step S27. The processing may include utilizing known processing functions such as fast Fourier transformation, Doppler shift analysis, Doppler rate analysis, direction-of-arrival or angle-of-arrival processing, time difference of arrival processing, frequency difference of arrival processing, and/or power, frequency, phase reference comparison between two or more receiving elements or instances in time.

The output of step S27 may be used for various processing steps. In step S28, the processed data may be synthesized with external sources such as the characteristics and origin of reference signals, orbital position, velocity and orientation data of the satellite. The synthesized data may then be used in coordinate transformation and projection of an approximate location on the surface of the earth in step S29. Thereby, the location of a transmitter can be estimated in step S30 (geolocation). Alternatively or additionally, the synthesized data may be synthesized using multiple analyses over time in step S31. Thereby, antenna characterizations, compliance measurements or spectral environment trending may be obtained in step S32.

Furthermore, the output of step S27 may be further processed by demodulating the received electromagnetic energy in step S33. Thereby, it becomes possible to perform a carrier signal analysis (step S34).

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

In any one of the above embodiments, the observation satellite may also comprise an additional receiving antenna having a receiving pattern directed away from the Earth, the antenna being suitable for receiving electromagnetic energy in the radio frequency range. In such a manner, it is possible for the observation satellite to receive a given signal being inputted to a given target satellite (orbiting at an altitude greater than the orbit in which the observation satellite orbits), as well as the repeated given signal being outputted by the target satellite. For example, the target satellite may be orbiting in a geostationary orbit, in which case the observation satellite's additional receiving antenna may be oriented in or near the zenith direction—provided that the observation satellite orbits at an altitude smaller than the geostationary orbit. The advantage of this approach is that it enables using the input and output signals together to cancel out some sources of error (any slight frequency drift of the given signal, for instance, which otherwise would result in geolocation solution errors) and enables characterization of performance of the target satellite itself.

The invention claimed is:

1. A satellite for obtaining information about electromagnetic energy emitted from a source, or from sources, on the earth,
   the satellite orbiting the earth in an orbit having an inclination larger than 90° and smaller than 270°; and
   the satellite comprising:
      at least one receiving antenna, the at least one receiving antenna
         having a receiving pattern directed towards the earth, and
         suitable for receiving electromagnetic energy in the radio frequency range as the satellite is orbiting relative to the surface of the earth, and
      a transmitter configured for at least one of:
         retransmitting, to another spacecraft, hereinafter referred to as "relay spacecraft", at least part of the received electromagnetic energy,
         transmitting, to the relay spacecraft, information representing at least part of the received electromagnetic energy; and
         transmitting, to the relay spacecraft, information derived from at least part of the received electromagnetic energy.

2. The satellite of claim 1, wherein the relay spacecraft to which the transmitter is retransmitting and/or transmitting is a relay satellite.

3. The satellite of claim 1, being suitable for obtaining information about electromagnetic energy emitted from a source, or from sources, on the earth and reaching the geostationary orbit.

4. The satellite of claim 1, wherein the transmitter is configured to transmit, towards the earth through the relay spacecraft, at least part of the received electromagnetic energy, or the information representing, or derived from, at least part of the received electromagnetic energy.

5. The satellite of claim 1, wherein the information derived from at least part of the received electromagnetic energy is obtained by processing at least part of the received electromagnetic energy within the satellite.

6. The satellite of claim 5, wherein the processing comprises at least one of:
   selectable down-conversion of analog signal to common intermediate frequency;
   analog-to-digital conversion of signals provided by at least part of the received electromagnetic energy;
   spectrum analysis of at least part of the received electromagnetic energy;
   Doppler shift analysis of at least part of the received electromagnetic energy;
   Doppler rate analysis of at least part of the received electromagnetic energy;
   direction of arrival or angle of arrival processing;
   time difference of arrival (TDOA) processing;
   frequency difference of arrival (FDOA) processing;
   reference measurements between two or more antenna elements;
   data filtering; and
   data compression.

7. The satellite of claim 1, wherein the at least one receiving antenna is suitable to receive electromagnetic energy in a radio frequency range between 1 GHz and 100 GHz.

8. The satellite of claim 7, wherein the at least one receiving antenna is suitable to receive electromagnetic energy in a radio frequency range being at least one of:
   between 1 and 2 GHz;
   between 2 and 4 GHz;
   between 4 and 8 GHz;
   between 8 and 12 GHz;
   between 12 and 18 GHz; and
   between 26.5 and 40 GHz.

9. The satellite of claim 1, wherein the at least one receiving antenna is suitable to receive electromagnetic energy in a radio frequency range used by geostationary satellites to receive, or send, signals from, or to, the earth.

10. The satellite of claim 1, wherein the at least one receiving antenna is suitable to receive electromagnetic energy having at least one of:
- a linear polarization;
- a vertical polarization;
- a horizontal polarization;
- an elliptical polarization; and
- a circular polarization.

11. The satellite of claim 1, wherein the at least one receiving antenna is configured to receive, during one orbital period, electromagnetic energy from an area covering more than half of the surface of the earth.

12. The satellite of claim 1, wherein the received electromagnetic energy comprises more than only information intended for controlling the satellite itself.

13. The satellite of claim 1, wherein the received electromagnetic energy comprises energy intended for at least one other satellite.

14. The satellite of claim 1, wherein the satellite orbits the earth in an orbit having an inclination larger than 175° and smaller than 185°.

15. The satellite of claim 1, wherein the satellite orbits the earth in an orbit having an apogee differing by no more than 4000 kilometers from the geostationary orbit.

16. The satellite of claim 15, wherein the satellite orbits the earth in an orbit having an apogee being any one of:
- between 31700 and 34700 kilometers above mean sea level; and
- between 36700 and 39700 kilometers above mean sea level.

17. The satellite of claim 1, wherein the satellite orbits the earth in an orbit having an eccentricity being smaller than 0.05.

18. The satellite of claim 1, wherein the satellite is not itself a communication satellite for relaying end user information from one point of the earth to another point on the earth.

19. The satellite of claim 1, wherein the transmitter is configured for transmitting, to the relay spacecraft, at least part of the received electromagnetic energy or the information representing, or derived from, at least part of the received electromagnetic energy using at least one optical communication link.

20. The satellite of claim 1, wherein the transmitter is configured for transmitting, to the relay spacecraft, at least part of the received electromagnetic energy or the information representing, or derived from, at least part of the received electromagnetic energy using at least one of:
- (a) specific dedicated microwave frequencies;
- (b) a transmitter able to dynamically adjust its transmission frequency band;
- (c) low-level spread spectrum; and
- (d) a store and forward method.

21. The satellite of claim 1, wherein the satellite further comprises
- a receiver connected to at least one receiving antenna,
- the receiver having sufficient spectrum agility and capability to be reconfigured to different frequencies across a broad range of the radio frequency spectrum.

22. The satellite for obtaining information about electromagnetic energy emitted from a source, or from sources, on the earth,
- the satellite orbiting the earth in an orbit having an inclination larger than 90° and smaller than 270°; and
- the satellite comprising:
  - receiving means for receiving, as the satellite is orbiting relative to the surface of the earth, electromagnetic energy in the radio frequency range, from a source, or from sources, on the earth using at least one receiving antenna having a receiving pattern directed towards the earth, and
  - transmitting means for at least one of:
    - retransmitting, to another spacecraft, hereinafter referred to as "relay spacecraft", at least part of the received electromagnetic energy,
    - transmitting, to the relay spacecraft, information representing at least part of the received electromagnetic energy; and
    - transmitting, to the relay spacecraft, information derived from at least part of the received electromagnetic energy.

23. The satellite of claim 1, wherein the satellite further comprises an additional receiving antenna, wherein the additional receiving antenna
- has a receiving pattern directed away from the Earth, and
- is suitable for receiving electromagnetic energy in the radio frequency range.

24. A system comprising at least two satellites according to claim 1.

25. A system comprising:
- at least one satellite according to claim 1, and
- the relay spacecraft.

26. The system of claim 25, further comprising:
- at least one ground station configured for
  - obtaining, from the relay spacecraft, the received electromagnetic energy or the information representing, or derived from, the received electromagnetic energy, and
- at least one processing station configured for
  - estimating, from the received electromagnetic energy or the information representing, or derived from, the received electromagnetic energy obtained by the at least one ground station, at least one of:
    - the composition of at least part of the received electromagnetic energy;
    - a location on earth of the origin of at least part of the received electromagnetic energy;
    - a level of received electromagnetic energy reaching at least part of the geostationary orbit; and
    - at least one characteristic of an uplink transmission.

27. A method for operating a satellite according to claim 1.

28. A method comprising:
- obtaining, by at least one ground station from a relay spacecraft, a signal
  - originating from a satellite orbiting the earth on an orbit having an inclination larger than 90° and smaller than 270°, and
  - conveying at least one of:
    - electromagnetic energy received by the satellite,
    - information representing electromagnetic energy received by the satellite, and
    - information derived from electromagnetic energy received by the satellite,
  and
- estimating, by at least one processing station, from at least part of the received electromagnetic energy or the information representing, or derived from, at least part of the received electromagnetic energy obtained by the at least one ground station, at least one of:
  - the composition of at least part of the received electromagnetic energy;
  - a location on earth of the origin of at least part of the received electromagnetic energy;

a level of received electromagnetic energy reaching at least part of the geostationary orbit; and at least one characteristic of an uplink transmission.

29. The method of claim 28, wherein estimating the location comprises estimating a longitude and latitude.

30. The method of claim 28, wherein estimating a location on earth of the origin of at least part of the received electromagnetic energy comprises estimating the location of an interference source.

31. The method of claim 28, wherein estimating at least one characteristic of an uplink transmission comprises estimating an uplink pattern of at least one of an antenna on earth; and a group of antennas on earth.

32. A use of a satellite according to claim 1, or information obtained from a satellite according to claim 1, for estimating at least one of:

the composition of at least part of the received electromagnetic energy;

a location on earth of the origin of at least part of the received electromagnetic energy;

a level of received electromagnetic energy reaching at least part of the geostationary orbit; and at least one characteristic of an uplink transmission.

* * * * *